United States Patent [19]
Davidson et al.

[11] Patent Number: 5,615,123
[45] Date of Patent: Mar. 25, 1997

[54] SYSTEM FOR CREATING AND PRODUCING CUSTOM CARD PRODUCTS

[75] Inventors: Leonard Davidson, Los Angeles; Matt Russell, Glendale; Scott Allred, Riverside; Michael S. Russell, Glendale, all of Calif.

[73] Assignee: CreataCard, Inc., Cleveland, Ohio

[21] Appl. No.: 679,263

[22] Filed: Apr. 2, 1991

[51] Int. Cl.$^6$ ........................................... G06F 17/00
[52] U.S. Cl. ................ 364/479.03; 493/458; 84/602
[58] Field of Search .................. 364/468, 479, 364/478, 401, 479.03; 395/2, 2.1, 102, 103, 150, 151; 84/1.19, 1.01, 616, 600–606; 381/2; 355/321; 271/184, 114; 283/34; 347/102; 493/458; 281/5, 2, 23

[56] References Cited

U.S. PATENT DOCUMENTS

| | | | |
|---|---|---|---|
| 4,467,525 | 8/1984 | Logan et al. | 33/18 B |
| 4,591,999 | 5/1986 | Logan | 364/523 |
| 4,712,174 | 12/1987 | Minkler, II . | |
| 4,750,122 | 6/1988 | Kaji et al. . | |
| 4,771,401 | 9/1988 | Kaufman et al. . | |
| 4,773,009 | 9/1988 | Kucera et al. . | |
| 4,811,240 | 3/1989 | Ballou et al. . | |
| 4,829,473 | 5/1989 | Keller et al. | 84/1.19 |
| 4,835,683 | 5/1989 | Phillips et al. . | |
| 4,864,502 | 9/1989 | Kucera et al. . | |
| 4,873,643 | 10/1989 | Powell et al. . | |
| 4,884,199 | 11/1989 | Boothroyd et al. . | |
| 4,906,024 | 3/1990 | Lein | 281/5 |
| 4,916,637 | 4/1990 | Allen et al. . | |
| 4,937,439 | 6/1990 | Wanninger et al. . | |
| 4,954,956 | 9/1990 | Yamakawa et al. . | |
| 4,962,475 | 10/1990 | Hernandez et al. . | |
| 5,076,611 | 12/1991 | Bouton | 281/3.1 |
| 5,129,036 | 7/1992 | Dean et al. | 395/2 |
| 5,160,797 | 11/1992 | Kim | 84/613 |
| 5,239,538 | 8/1992 | Teel, Jr. et al. | 370/583 |
| 5,303,326 | 4/1994 | Dean et al. | 395/2 |
| 5,402,518 | 3/1995 | Lowery | 395/2.1 |
| 5,461,408 | 10/1995 | Giles et al. | 347/102 |

OTHER PUBLICATIONS

The ABC's of The New Print Shop, V. Dubrovin (1990) pp. 1–31.
The New Print Shop, Broderbund Software (1989) pp. 8–9.

*Primary Examiner*—James P. Trammell
*Attorney, Agent, or Firm*—Jones, Day, Reavis & Pogue

[57] ABSTRACT

A method of and apparatus for creating and producing printed card products such as greeting cards for various applications, whereby a customer can select a card product for a desired application and customize or personalize certain portions of the selected card product. A terminal area or kiosk is provided at which the customer selects from a monitor screen display one of a number of different general applications for which he/she wants to obtain a card product. Upon entry of the selection via, e.g., a transparent touch-sensitive plate on the monitor screen, one or more pre-stored groups of card product design formats pertaining to the selected general application are determined, and further inquiries are made via the monitor screen to elicit certain information relating to a specific use or application for the desired card product. Once this information is entered, certain ones of the determined card product design formats are identified as pertinent and are displayed to the customer who is then permitted to choose a card product format that he/she would like to customize. Further inquiries via the monitor screen elicit appropriate text to be reproduced at designated locations in the format of the chosen card product. The customized card product is then created by, e.g., a multi-color ink plotter that is fed with specially prepared sheets of card stock.

10 Claims, 39 Drawing Sheets

Fig. 14

SYSTEM FOR CREATING AND PRODUCING CUSTOM CARD PRODUCTS

BACKGROUND OF THE INVENTION

1. Field of the Invention

The present invention relates generally to a system that enables a customer to produce printed card products having desired graphic design elements and text for an intended use or application and, more particularly, to such a system wherein card products having certain design components and text formats are pre-stored for selection by the customer who may then customize or personalize the product by entering, for example, actual names of the sender and the recipient of a greeting card.

2. Description of the Known Art

A system that enables a user to generate greeting cards and other printed documents wherein desired textual matter can be inserted at designated locations on the card, is available as a software package sold under the name of "The New Print Shop" by Broderbund Software, Inc. Upon selection of a greeting card mode from a main menu display, the user views pre-stored "ready made" cards. The front of a chosen card is displayed first along with five menu choices respecting border, graphic, message, inside of card, and customization. Next, the inside of the card is viewed and a text message inserted. When finished, the card is reproduced with a conventional printer.

A computerized system for generating pseudorandom text so as to produce a form of greeting card is disclosed in U.S. Pat. No. 4,712,174 issued Dec. 8, 1987. Specifically, a "PC" compatible computer is tied to a dot matrix printer and monitor, and is provided with a conventional keyboard. Poetic text is pseudorandomly generated upon entry of a name, residence, gender, message or occasion, and primary and secondary traits. A kind of message or occasion to be represented by the card is selected from among a number of possibilities each displayed with a 3-letter identifier. Similar prompts are displayed concerning the recipient's most descriptive trait and secondary traits. Once all of the prompted information is entered, a poem addressed to the named recipient is displayed with a title, and an alternative text can be displayed at the option of the customer. When approved, the selected poem is outputted to the printer.

Nonetheless, there remains a genuine need on the part of consumers to be able to select easily and quickly a card product for most any occasion which product represents or reflects precisely the message intended to be conveyed by the product. The systems mentioned above have their limitations both in the quantity of different kinds of cards available for the many kinds of occasions for which persons customarily exchange cards, and the quality of the card product itself, i.e., the number of different character fonts available for text and the variety, resolution and color of graphic design elements that usually form a substantial portion of any printed card product, especially greeting cards.

Several computerized systems for producing greeting cards or invitations with special calligraphy, have been made available to the general public.

First, a stand-alone retail store installation known as "The Magical Poet" enables access by store customers to the pseudorandom text generation system which is the subject of the mentioned U.S. Pat. No. 4,712,174.

The so-called Hallmark Computer System allows for limited personalization of seven pre-printed cartoons, a single form "news" sheet called "The Birthday Times" or a similar sheet headed "The Anniversary Times". During the Christmas season, a "Letter to Santa" may be offered. The pre-printed forms are completed via a dot-matrix printer, and the system is operated entirely by the retailer.

Also known is the so-called InScribe Calligraphy System which uses a computer and a plotter to print invitations with calligraphy fonts that appear to be hand-drawn. Again, the system is operated entirely by the retailer leaving the customer without the opportunity to interact or interface directly with the computer system such as by a keyboard.

Changes in life styles and society generally have an impact on the look and content of greeting cards. Markets for specialized events or certain holidays are also increasing. Moreover, personalized or custom generated greeting cards afford an innovative marketing technique. By focusing on these new products and marketing directions, e.g., cards that reflect "today's woman" new greeting card companies have shown significant growth factors as compared with those companies that have remained with the traditional card lines.

SUMMARY OF THE INVENTION

An object of the invention is to overcome the above and other shortcomings of the known arrangements for producing custom or personalized card products, especially greeting cards.

Another object of the invention is to provide a system for creating and producing card products in which many different card design formats can be pre-stored in a given category such as birthday greeting cards, but all of which formats need not be displayed to a customer prior to his/her final selection thereby saving valuable time.

A further object of the invention is to provide a system for creating and producing card products in which available card design formats are displayed to a customer only after entry of specified information relating to the application or use for the product thereby limiting the number of displays to those necessary and appropriate for selection by the customer.

Another object of the invention is to provide a system capable of filling current voids in the greeting card market by meeting a customer's desire to obtain fully customized greeting cards, current event cards, regional and specific event cards, foreign language cards, and cards which express exactly that which the customer wants to convey.

A further object of the invention is to provide a system that is both easy and entertaining for the customer to interact with.

A further object of the invention is to provide a greeting card producing system in which the customer is able to view the card while being created, line by line, prior to final printing of the card.

Another object of the invention is to provide a number of retailer benefits including the ability to stock thousands of cards in only several square feet of floor space, avoid losses from damaged, out-of-date or out-of-stock cards, and ensure that the retailer's name and address can be printed on the rear surface of every card sold.

A further object of the invention is to provide a custom greeting card system in which a computer, monitor, touch screen, printing device, software and related items are installed in an attractive display terminal or kiosk, and which is capable of being easily maintained by a retailer.

Another object of the invention is to provide a greeting card system in which a customer can personalize or customize a card by making a series of selections from a user friendly menu displayed on a monitor having a "touch screen" arrangement, thereby eliminating the need for a conventional keyboard.

A further object of the invention is to provide a greeting card system in which a finished card is created on paper sheet stock having a fine finish and which sheet is pre-scored and trimmed so as to allow the customer to fold the sheet and obtain a finished card the edges of which are straight and perfectly aligned with one another.

Another object of the invention is to provide a system capable of producing fully-customized greeting cards and invitations in any desired number and in which the recipient's name may be included as well as that of the sender. Specific data such as birth date, age, anniversary date, years married, grade and date graduated, degree obtained, name and kind of pet, type of relative, type of relationship, and the like data may also be included.

A further object of the invention is to provide a greeting card system in which so-called current event cards can be produced by a customer within a relatively short time of the happening of the event, thus overcoming present lengthy time delays of typically more than 18 months from approval of a new card design to the time the card reaches a retailer's shelf. The present system aims to allow a customer to produce a card containing current events and social trends within just days from creation of the basic card elements.

Yet another object of the invention is to provide a greeting card system in which it is economically feasible to produce regional and/or special event or location cards that address political, sports and social events which cards have recognized meaning only within certain locales. Cards specific to an event such as a rock concert, sporting event, convention or a particular resort location, similar to postcards, may be produced by the present system.

Yet another object of the invention is to overcome existing financial restrictions in the greeting card industry, and allow lesser holidays and events, including many ethnic and religious holidays, to be commemorated via a printed card.

Still another object of the invention is to provide a greeting card system in which selection screens on a customer monitor may be provided in several languages for international sales and for sales in ethnic areas domestically. Certain minorities not conversant in the English language may nonetheless be able to create and send finished cards to their native country in their own language or retain part of their ethnic heritage by sending such cards to friends and relatives in the United States.

Another object of the invention is to overcome certain problems in ordering and printing of invitations, by providing retailers with a system in which few if any invitations will be returned as incorrect, and in which personalized invitations for smaller gatherings and parties are made readily available in an economical manner.

Another object of the invention is to provide a greeting card system capable of presenting a choice of pre-designed cards that can be customized and with an option to enter a personal message onto the card.

A further object of the invention is to provide a retailer in whose store the present system is installed, with the following benefits:

1. An ability to stock thousands of cards, normally occupying hundreds of square feet of valuable floor space, in as little as a 2-foot by 4-foot area.
2. No purchasing losses arising from cards that do not sell well or which have become outdated. Further, so-called shop-worn cards created by customer handling and damaging, can be eliminated.
3. No lost sales due to being out-of-stock on a "hot selling" card inasmuch as the present system allows an unlimited number of particular cards to be printed.
4. Since the present system has an entertainment quality, it will act as a drawing card to a retailer's store thus enabling the retailer to derive intangible benefits, e.g., enhanced sales in non-greeting card products due to increased traffic flow.
5. Printing of the retailer's name and address on the back of every card created via the present system, thereby affording the retailer with an invaluable marketing tool.

According to the invention, a method of creating and producing printed card products for various applications, comprises the steps of allowing a customer at a terminal area to select one of a number of different general categories or occasions for a desired card product; providing a number of groups of card product design formats whereby each group includes card product design formats pertaining to one of said general categories or occasions, and each card product design format in the group has at least one of textual and graphic material; and determining which of said groups of card product design formats pertains to the general category or occasion selected by the customer. Each of the card product design formats in a determined group is distinguishable from others in the group according to certain information relating to an intended use or application for the desired card product. The method also includes eliciting said certain information from the customer after selection of a general category or occasion, and identifying which of the card product design formats in a determined group of formats pertaining to the selected general category or occasion, includes card product design formats conforming to the certain information elicited from the customer.

The identified card product design formats are then displayed and the customer is permitted to choose a card product having a desired design format. The method also includes enabling the customer to customize his/her chosen card product by further eliciting of the customer certain additional information for reproducing at designated locations in the design format of the chosen card product, and producing a customized finished card product on a recording medium in the desired design format and with the additional information appearing at the designated locations on the recording medium.

According to another aspect of the invention, apparatus for creating and producing finished card products includes; a customer terminal area, monitor means having a screen at the terminal area to enable displays of informative material to a customer concerning the creation and production of a desired card product, input means to enable the customer to respond to inquiries or prompts displayed on the screen at the terminal area, and means for reproducing a desired card product on a recording medium.

Processor means responsive to the input means controls operations to be performed by the monitor means and the reproducing means according to customer-entered information, the processor means including storage means for storing a number of groups of card product design formats with each group including design formats pertaining to one of said various applications and each design format in the group has at least one of textual and graphic material wherein each design format in a given group is distinguishable from others in the group according to certain information relating to an intended use or application for the card product desired by the customer. Also included are means for generating first displays on the screen of the monitor means to enable a customer to select by the input means one of the applications for which the customer wants a card product, means responsive to the input means for determining which of the groups of the design formats pertains to the selected application, means for generating second displays on the screen of the monitor means so as to elicit from the customer said certain information via the input means after selection of the application; means responsive to the input means for identifying which of the card product design formats in a determined group pertaining to the selected application, includes design formats conforming to the certain information entered by the customer; means for generating third displays on the screen corresponding to each identified design format pertaining to the selected application and said certain information entered by the customer, means for permitting the customer to choose via the input means a displayed card product of a dersired design format, and means for generating fourth displays on the screen to elicit certain additional information via the input means for reproduction at designated locations in the format of the chosen card product, thus enabling the customer to customize the chosen card product.

The apparatus further includes means for controlling the reproducing means to produce a customized finished card product on the recording medium in the desired design format and with said additional information appearing at the designated locations on the product.

According to a further aspect of the invention, a method of playing back a large-sized sound data file accessible by data handling apparatus, such that downloading and reproducing of the file can be terminated at one of a number of successive intervals during the downloading/reproducing operations in response to an interrupt command, includes storing an entire sound data file in sound storage means such that selected portions of the sound data file can be accessed by the apparatus, allocating a first memory area in the apparatus at a time when the sound data file is called for, and reading out a first block of the sound data file from the sound storage means into the first memory area of the apparatus.

The method also includes detecting if a sound interrupt command has been generated through reading out of the first block of the sound data file into the first memory area of the apparatus, and terminating operations with respect to the sound data file if the sound interrupt command is detected; reading out additional blocks of the sound data file in succession from the sound storage means into the first memory area provided no sound interrupt command is detected prior to reading out of each successive block of the sound data file and until blocks representing the entire sound data file are read out of the storage means into the first memory area, terminating operations with respect to said sound data file if the sound interrupt command is detected prior to reading out of a next successive block of the sound data file, and allocating expanded memory means of the apparatus to have a capacity adequate to store the entire sound data file.

The method further includes moving blocks of the sound data file from the first memory area into the expanded memory means until the entire sound data file is moved into the expanded memory means in the absence of a sound interrupt command, allocating a second memory area of the apparatus and moving blocks of the sound data file from the expanded memory means into the second memory area, reproducing from the second memory area the blocks of the sound data file while detecting, after reproduction of each block of the sound data file, if a sound interrupt command has been generated, and terminating reproducing operations with respect to the sound data file if said sound interrupt command is detected prior to reproducing a next successive block of the sound data file from the second memory area of the apparatus.

According to yet another aspect of the invention, a technique of outputting instructions for plotting text characters in a specified size and with a desired font style to a plotter, includes determining a font style and a font size specified for a string of text characters to be plotted, opening a pre-stored file containing, for the determined font style, a kern value and a text character height, and reading from the pre-stored file a font character record including plotting instructions for each text character to be plotted together with a character width and character start coordinates.

The technique also includes determining from a prestored table containing a number of different specifiable font sizes with associated scale factors, a scale factor for use with the specified font size; multiplying the determined scale factor by each of the text character height, the text character width and the kern value, thereby obtaining dimensions for each text character and for spacings between the text characters; and plotting the string of text characters by instructing a plotter to plot each of the text characters according to the obtained dimensions in the specified font style and the specified font size.

According to another aspect of the present invention, a method of preparing and folding a flat sheet of stock material to form a generally rectangular book-like card, whereby edges of page surfaces of the card are aligned with one another when the stock is folded to form the card, includes the steps of determining desired finished dimensions for the book-like card including a vertical height and a width, and substantially doubling the desired finished vertical height and width dimensions of the card thereby arriving at initial height and width dimensions for a flat sheet of stock material. A horizontal center line extending medially of the top edge and a bottom edge of the flat sheet, and a vertical center line extending medially of a left edge and a right edge of the flat sheet, are defined.

The flat sheet of stock material is pre-scored along a horizontal parallel offset line spaced a first predetermined distance above the horizontal center line in the vertical direction, and the sheet is also pre-scored along a vertical parallel offset line spaced a second predetermined distance from the vertical center line in the horizontal direction toward the left edge of the flat sheet. An outside front page surface of the card is defined by a lower right-hand quadrant formed by an intersection between the horizontal offset line and the vertical offset line, and an outside rear page surface of the card is defined by a lower-left hand quadrant formed by the intersection.

A tapered edge on the flat sheet is cut between a point on the top edge of the sheet located a third predetermined distance from the right edge of the sheet and a point on the right edge coincident with the horizontal offset line. The flat sheet is folded along the pre-scored horizontal offset line so that the upper portion of the sheet is folded behind the outside front and the outside rear page surfaces, and the sheet is folded along the pre-scored vertical offset line so that the folded upper portion of the sheet defines the two opposed inside page surfaces of the book-like card. The first, the second and the third predetermined distances are set so that the edges of all page surfaces substantially coincide with one another when the book-like card is closed.

According to a further aspect of the invention, a system for enabling sheet feeding of a printer or plotter device having a sheet feeding mechanism, includes a housing adapted to be fixed on a part of the printer or plotter device in the region of a sheet load button of the sheet feeding mechanism, and plunger means fixed on the housing for exerting an actuating force on the sheet load button when the plunger means is energized. Delay means coupled between the plunger means and means for supplying power to the printer device, energizes the plunger means and causes the sheet load button of the device to be actuated after a first time delay corresponding to at least an initial start-up period of the device once power is supplied to the device, the sheet feeding mechanism being inoperative during the start-up period.

Accordingly, the sheet load button is actuated a sufficient time after initial turn-on of the device so that a sheet of recording medium will be fed by the sheet feeding mechanism from a sheet supply onto a printing bed of the device.

The various features of novelty that characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

In the drawing:

FIGS. 4 to 17 are representations of screens displayed on a monitor in the terminal of FIG. 1 during a card selection and customization routine according to the invention;

DETAILED DESCRIPTION OF THE INVENTION

Figure 1:
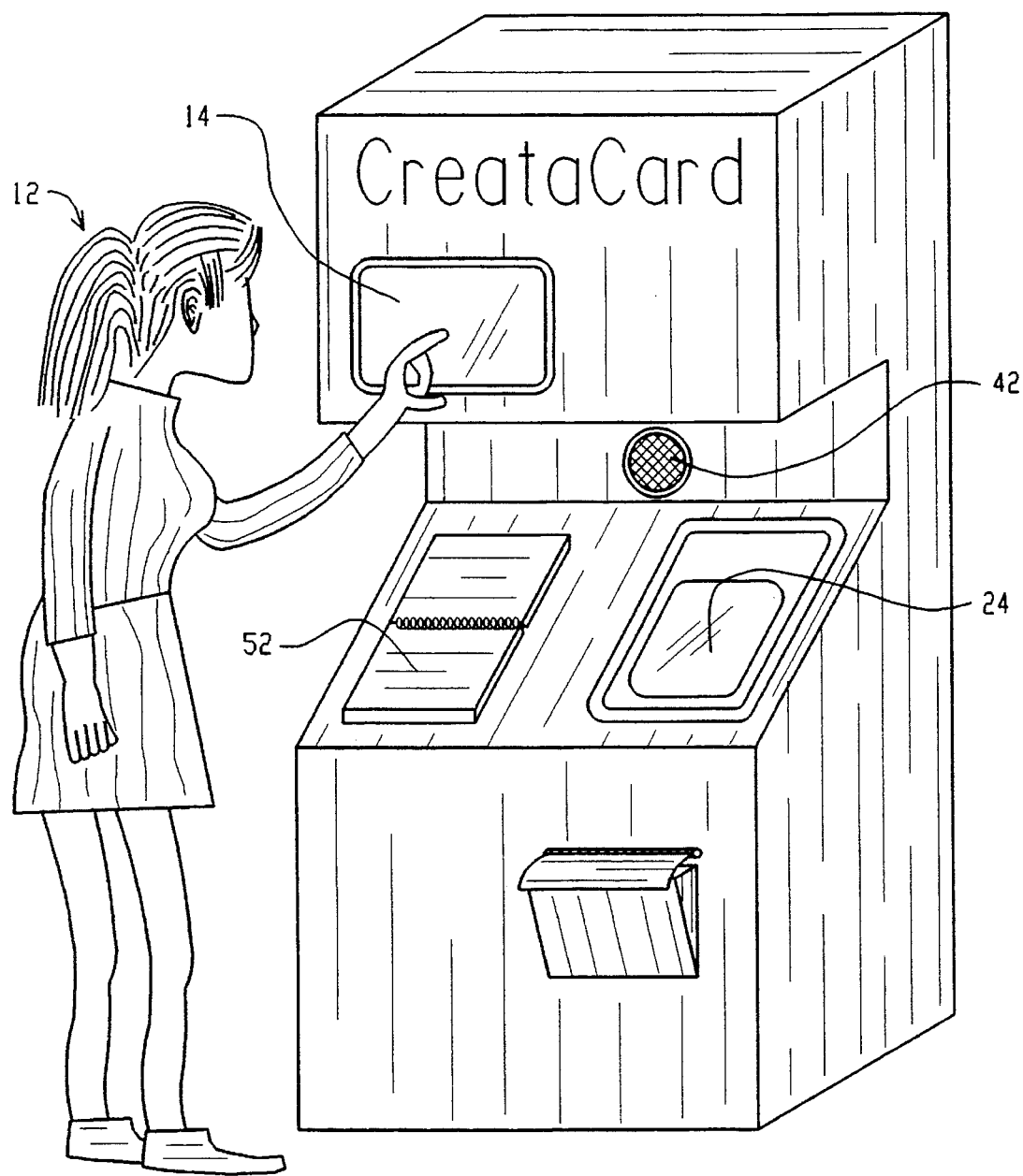
FIG. 1 is a perspective view of a customer terminal or kiosk including a greeting card system according to the invention.

FIG. 1 is a view of a customer terminal or kiosk 10 which houses a system for creating and producing custom greeting cards, invitations and the like, according to the invention.

As used herein, the terms "greeting card" and "card product" are meant to refer both to greeting cards generally such birthday, anniversary, graduation, various holiday cards and the like, and to any other kind of printed sheet, card or announcement including, but not limited to, invitations, thank-you cards, announcements of various kinds including new births, certificates, awards, personalized horoscopes, posters, plaques, game boards, charts, calendars, art work, stationery, signs, party paperware including place mats, bibs and name badges, bumper stickers, and any other printed item capable of being produced by feeding a sheet of paper stock or other recording medium into a reproducing device such as an ink plotter or printer.

It is preferred that the terminal 10 be in the form of an interactive kiosk, i.e., a computer driven system placed in a retail environment so as to induce a consumer or customer 12 to react with, and benefit by, information displayed on a monitor 14 of the terminal 10.

Customer acceptance of computer interaction or interfacing in a retail environment has been proven and believed on the increase. Typically, customers make purchases from an interactive kiosk by first selecting and then charging the merchandise they want. Selected products are then mailed to their home; however, customers prefer to leave a retail environment with their chosen products in hand. The present system operating through the terminal 10 affords customer 12 an opportunity to create and produce a desired product in situ. Further, use of the monitor 14 enables advertising screens with accompanying reproduced speech to be presented recurringly during periods when the present system is not being used to produce a greeting card. Accordingly, it is contemplated that the embodiment of the present system in the form of an interactive kiosk would prove most acceptable to retailers and the public in general; however, structures other than the particular terminal 10 shown in FIG. 1 may also be used to accommodate or house the various components of the present system. Also, the terminal 10 can be configured from varying styles, colors and shapes depending on the retailer's requirements.

Figure 2:
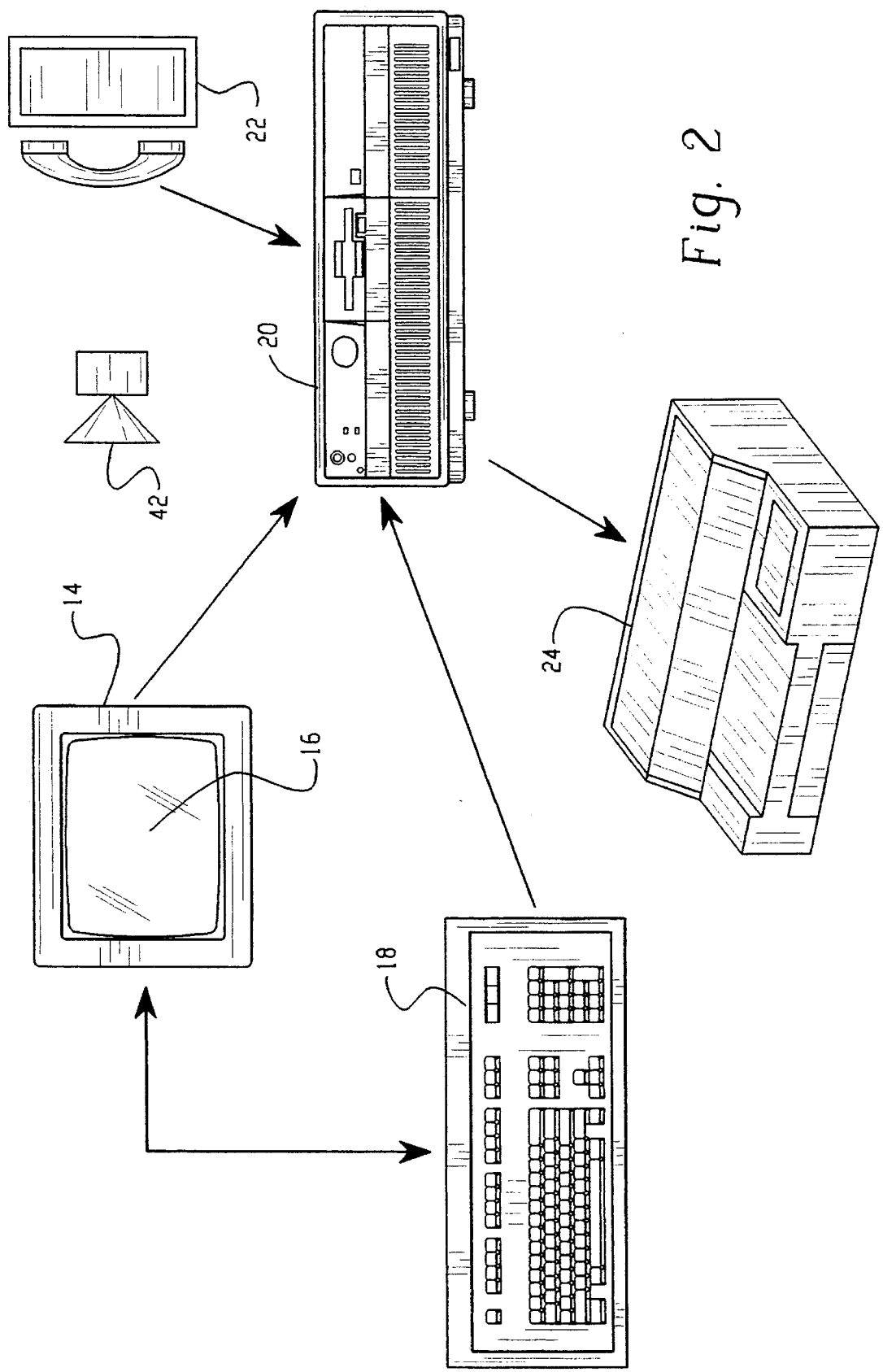
FIG. 2 is schematic representation of components included in the terminal of FIG. 1.

FIG. 2 shows the basic components of the present system for creating and producing custom greeting cards. Monitor 14 is preferably of an "EGA" or "VGA" type that will interface with a conventional touch screen plate 16. The touch screen plate 16 may include a transparent finger-pressure sensitive activating device capable of signaling to a computer 20 the relative location on the monitor screen at which the customer 12 places a finger in response to a graphic display or prompt on the monitor screen. See, for example, the various touch "buttons" displayed on the monitor 14 in FIGS. 4–11. One known touch screen plate that has worked satisfactorily in the present system is available as model E-274 from Elographics company in Oak Ridge, Tenn.

A keyboard 18 may be optionally provided for allowing the customer 12 to enter desired information into the system, other than by way of the touch screen bezel 16.

The computer 20 is coupled to the monitor 14, keyboard 18 and any other peripheral devices that may be provided. The computer 20 may be comprised of conventional components including, for example, an "AT" mother board with up to 16 Megabytes of memory, large hard disk storage capacity, 10 to 44 MHz speed, floppy drive, internal clock, EGA or VGA video board, serial and parallel interface and internal modem. A video disk may be included if desired.

The computer 20 preferably has telephone communications link capability through its modem so as to enable the present system to be accessed via a public telephone installation or link 22.

A high quality printing device such as an ink plotter or a laser type printer 24 is coupled to an output of the computer 20 and serves to print a finished, customized card on a high quality sheet of card stock, preferably in view of the customer 12 so as to provide an entertainment factor while the customer stands at the terminal 10.

Figure 3:
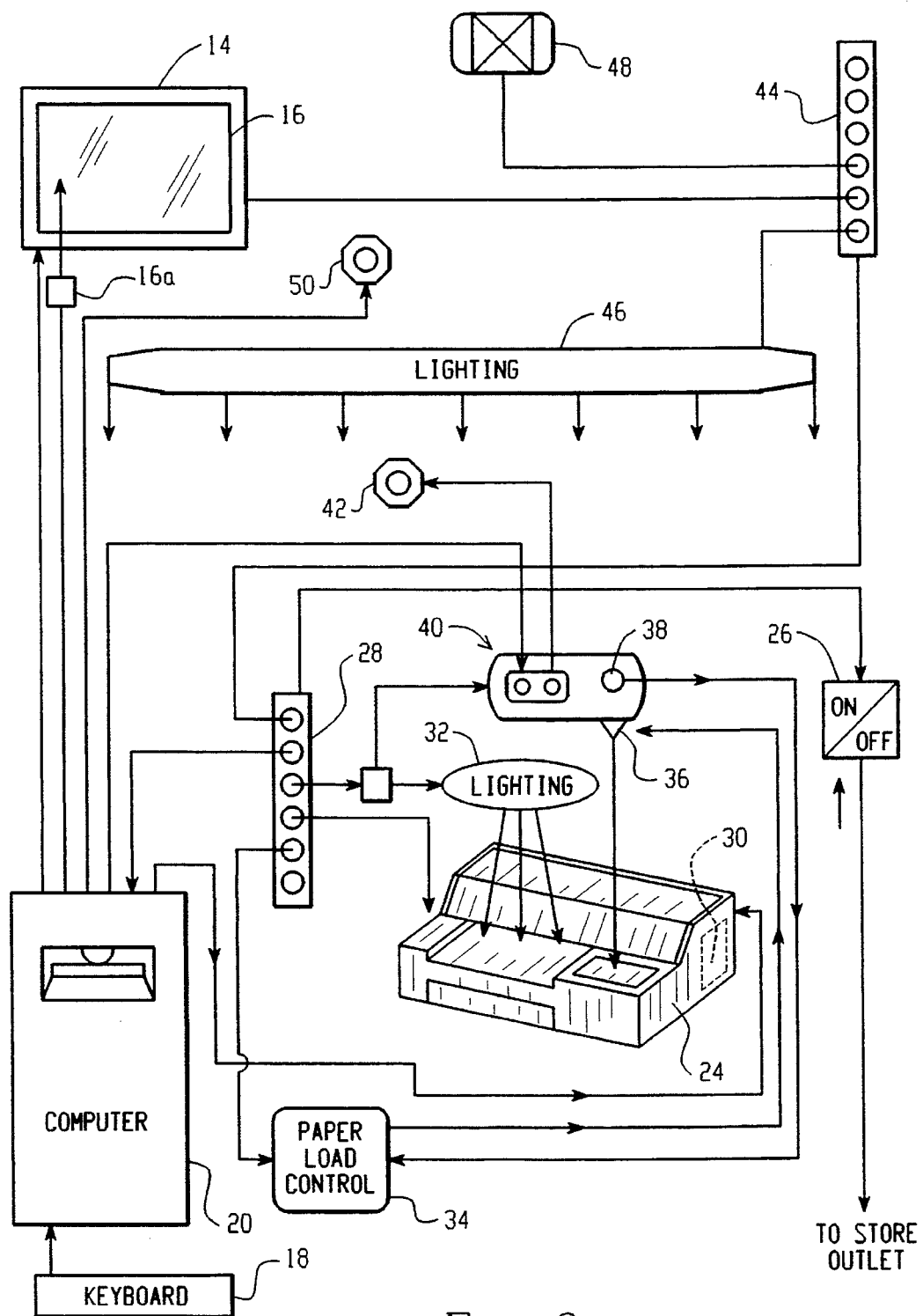
FIG. 3 is a schematic block diagram showing interconnections between the components of the terminal in FIG. 1.

FIG. 3 is a diagram showing in greater detail the connections between the various components at the terminal 10.

A main power switch 26 controls the supply of power from the AC mains of a retail store at which the terminal 10 is placed. A lower power outlet strip 28 is energized when the switch 26 is in the ON position, and supplies power to components of the system that are connected to the strip 28 including the computer 20 and the printing device 24. An internal printer buffer 30 buffers the output of the computer 20 that drives the printing device 24. Lighting 32 for the printing device 24 is also powered via the outlet strip 28.

Figures 35, 36:
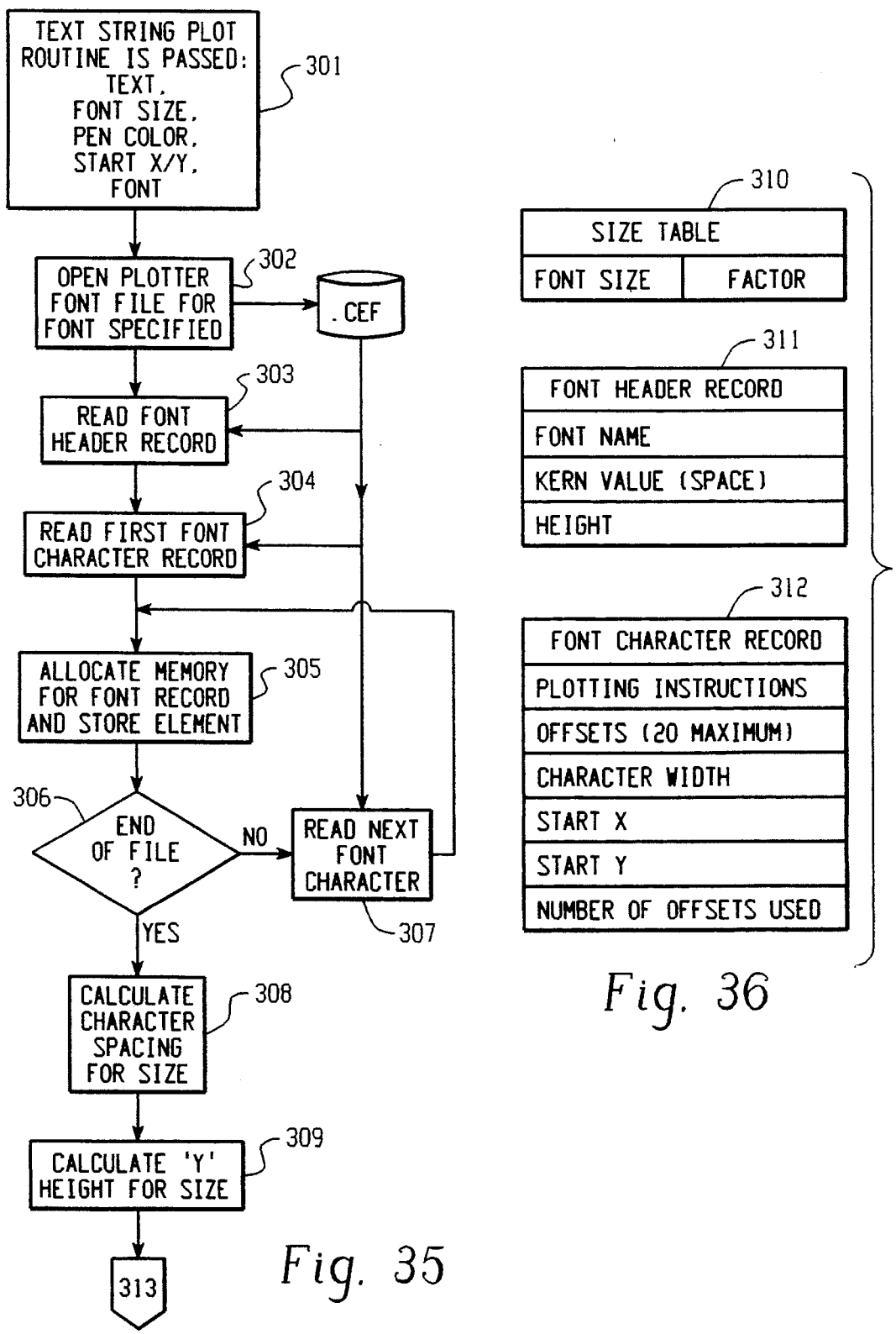
Figure 37:
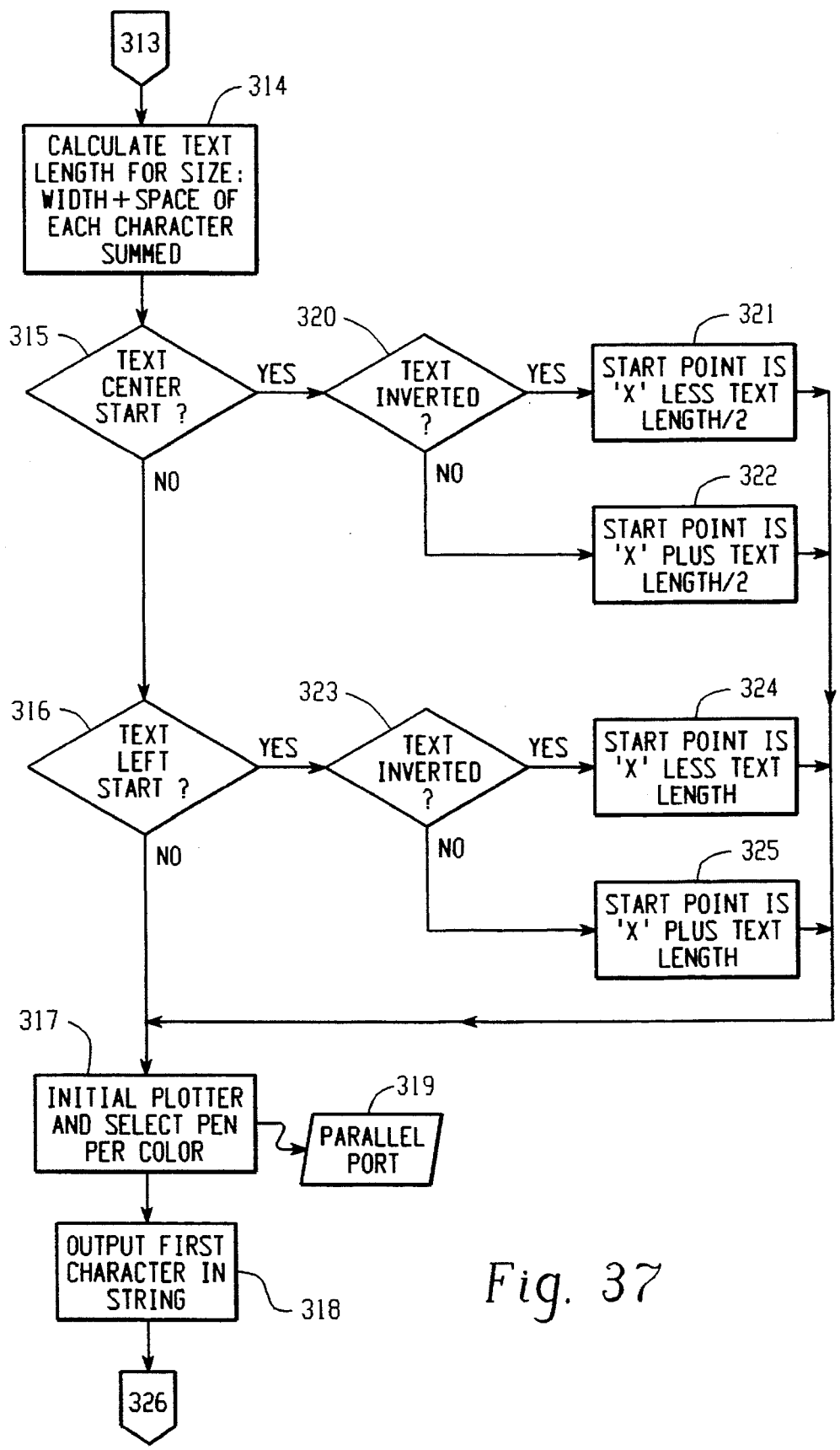
Figure 38A:
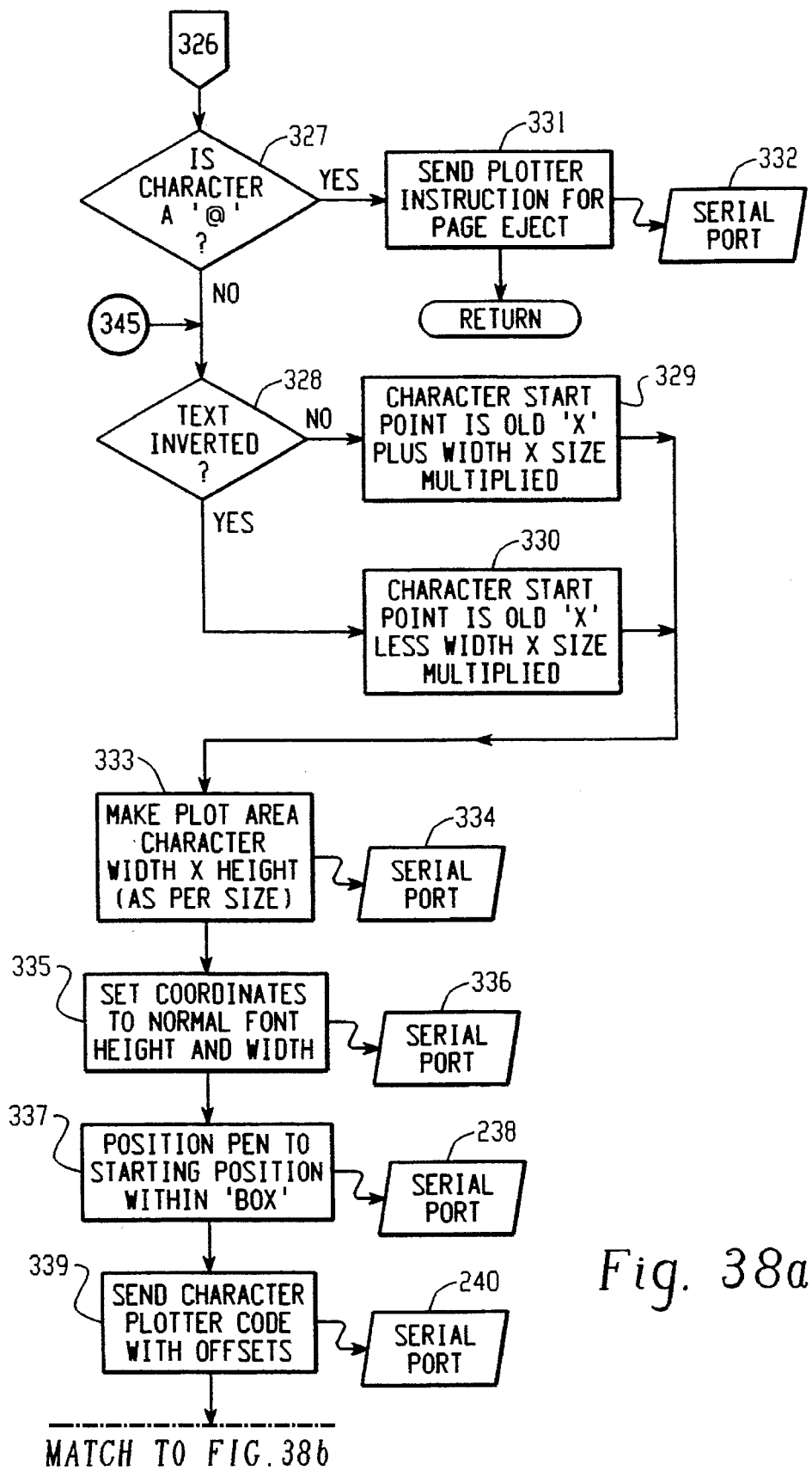
Figure 38B:
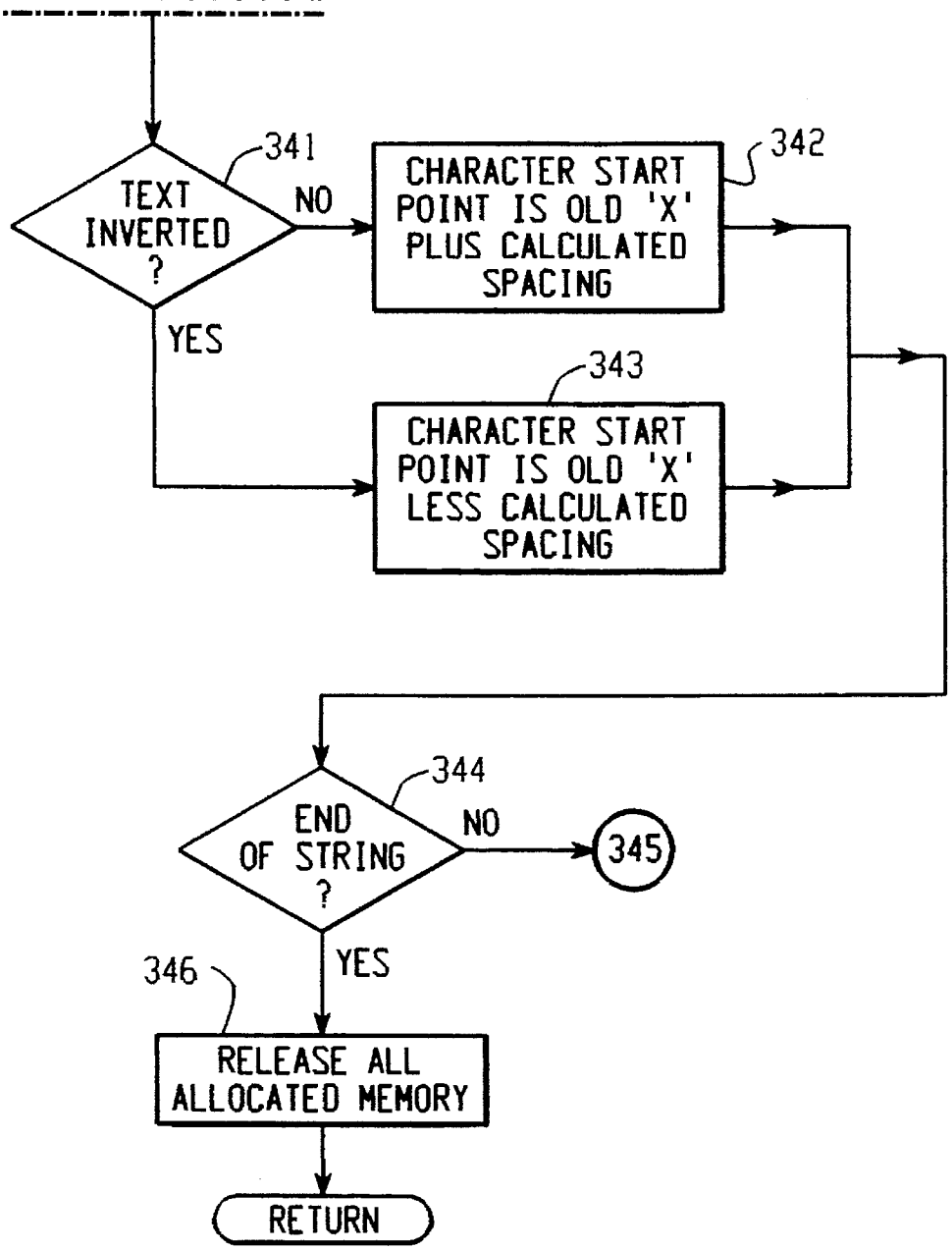

A paper load control device 34 connected to the outlet strip 28 serves to enable feeding of a sheet of card stock onto a printing bed of the printing device 24 each time the power switch 26 is turned on by the retailer or other person in charge. Basically, the device 34 causes a paper load striker 36 to actuate a paper feed button on a control panel of the printing device 24 at a predetermined time, without requiring manipulation of any control buttons on the panel of the printing device 24 by an operator. Details of the paper load control device are set out further below in connection with FIG. 36.

A remote paper load button 38 associated with the paper load control device 34 causes the striker 36 to advance and cause loading of a sheet of card stock when, for example, a new supply of card stock sheets is loaded in a feed tray of the printing device 24.

Audio control 40 is provided to enable control over the volume level and tone from a speaker 42 housed in the terminal 10. Speaker 42 is coupled through the control 40 to a speech or voice output line from the computer 20.

An upper power outlet strip 44 is connected to one of the outlets of the lower power outlet strip 28, and has its own outlets for energizing an upper lighting array 46, the terminal monitor 14, and a ventilation fan 48. Also mounted in the enclosure of the terminal 10 is a "beep" speaker 50 connected to a conventional beeping alert output circuit of the computer 20.

As discussed above in connection with FIG. 2, the computer 20 can be tied via an internal modem to a telephone link (not shown in FIG. 3) so as to enable access to the computer from a remote location for purposes of revising and updating stored files, and performing desired data gathering operations for statistical and accounting purposes.

When the power switch 26 is turned on, and the computer 20 and its peripheral equipment are energized, a pre-stored program in the computer 20 initiates the card product selection and customization operations by way of, inter alia, a series of textual and graphic screens presented on the monitor 14 such as those shown in FIGS. 4–17.

Basically, the program enables the computer 20 and peripheral equipment to produce customized card products including greeting cards, invitations, awards or other printed items based on entries provided by the customer 12, according to the following scheme:

(1) By using input devices such as the touch screen plate 16 on the monitor 14, and/or the keyboard 18, the customer 12 can select and enter information that will allow for selection of a card product and, once selected, for customization of the product.

(2) The entered information is derived primarily by eliciting of the customer 12 (or retailer displaying the system) the answers to a series of questions prompted on the monitor screen.

(3) The product to be customized may be selected initially from either (a) a sample binder 52 (FIG. 1) or an adjacent display rack (not shown), or (b) a presentation on the monitor screen by computer access of pre-stored "sample" card files. For most retail applications, the selection method (b) alone is quite sufficient and may be the only initial selection method incorporated in the basic system program. Selection method (a) may be provided as an option for certain applications.

Figure 18:
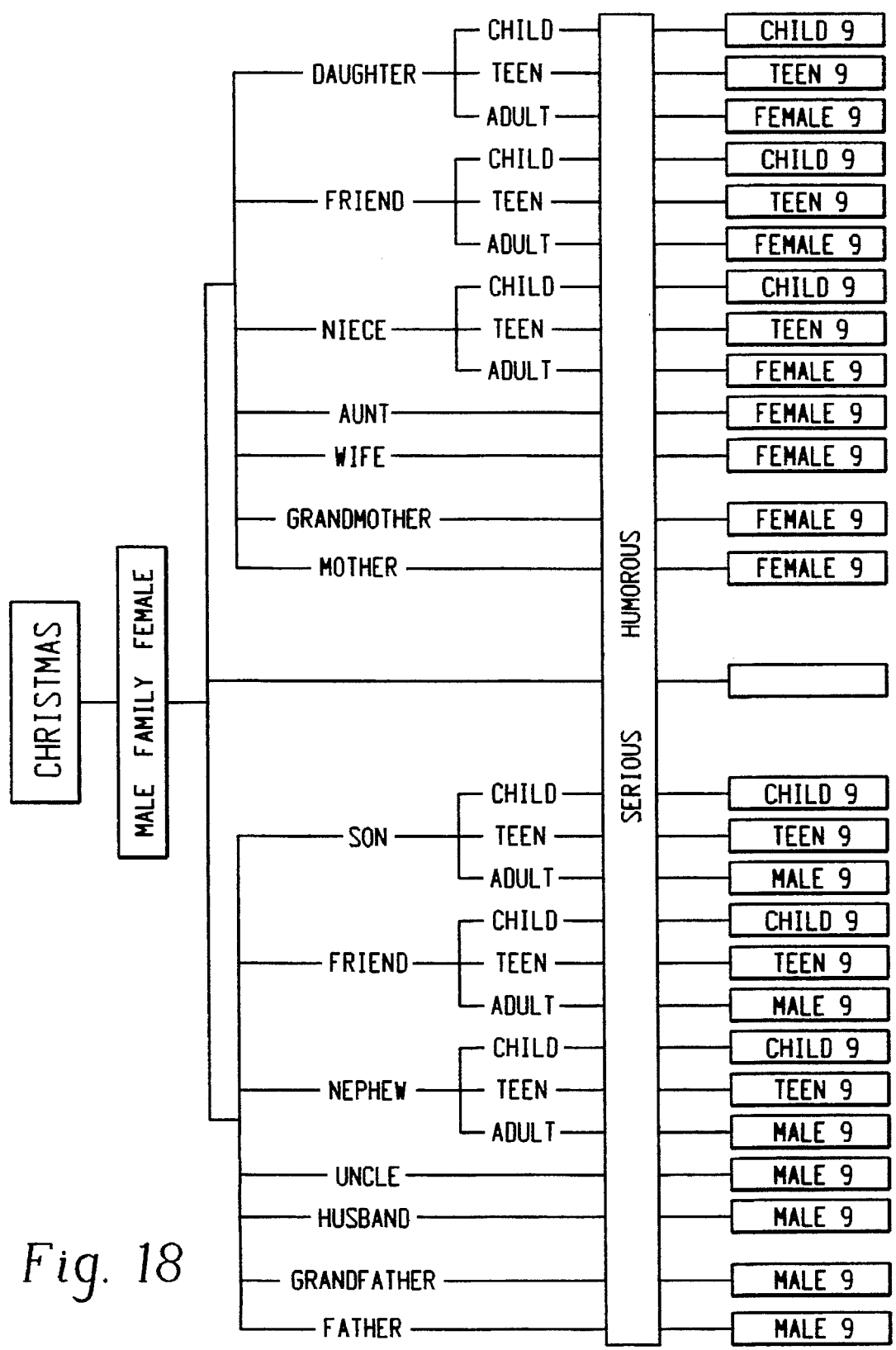
FIG. 18 is a schematic representation of a sort routine carried out by the present system when a customer selects Christmas as the occasion for a card.

(4) If the card or other product is selected by the computer 20, it is done initially through a "sort" program such as the "Christmas" sort routine in FIG. 18. Selection of computer displays of card design formats pertinent to the desired product is based on customer entries directed to the intended use or application of the product which, in the case of greeting cards, includes but is not limited to occasion, event, type or style of card, recipient's age group, gender, sender's relationship to recipient, recipient's interests, recipient's characteristics, and other items that may be specific to the recipient and/or sender. The pool of products that computer 20 may select thus can vary from only a few for products of a certain category, to thousands for products in other categories.

(5) As noted earlier, cards or other products that can be accommodated by the present system include, but are not limited to, customized greeting cards, invitations, awards, certificates, horoscopes, "For Sale" signs, bumper stickers and car signs, calendars, "special event" items, plaques, books, activity sheets, directional signs, party kits, stationery, business cards, note pads, address labels, legal forms and other printed materials.

(6) After selection by the customer of a particular card or other product having attributes suitable for a particular occasion or event, the customer 12 responds to a series of questions that will enable the computer 20 to customize or personalize the product. As shown for example in FIG. 13, the customization operation includes, but is not limited to, the places from which and to which the card is being sent, the sender's name, the recipient's name and the date. Other information for customization of the product may include the recipient's age, the date, a school or college, degree obtained, award received, goal obtained and the like, all depending on the nature of the basic product selected.

(7) Each time a selection or entry is made by the customer 12, computer 20 accesses several pieces of information. These include identification of the location or coordinates on the touch screen plate 16 at which the customer places his/her finger to make an entry, the selection of a next or previous prompting screen, return of a code that allows for the product sort process, and identification and placement of customized text and/or graphics on the product.

(8) Once the above steps are completed, the card or other product can be displayed on the monitor screen so as to allow the customer to make some final selections. Finally, the customer prints the product on a sheet of recording medium specific to the product, for example, specially finished and pre-scored greeting card stock in the case of a greeting card product, so as to allow for easy and proper folding. For other products, the paper may be perforated for ease of tearing, and some paper may be provided with pre-printed graphics and/or text.

FIGS. 20–37 show details of a program for enabling the computer 20 and its peripheral equipment to carry out the present greeting card selection and customization technique.

Program Background

The system operation represented in FIGS. 21–28 uses in several forms full and partial screen-sized graphic marketing presentations; menus with visible touch zones or boxes for menu control, selection and data entry; card facsimiles; and the like. Advertising screens can also be displayed on the monitor 14 at times when the system is not responding to customer entries. The various graphic screens can be produced using available design or "paint" programs.

Also used are digitized sound (voice) recordings. Examples are set out in Table 1, below:

TABLE 1

| No. | Type Screen | Voice Text |
|---|---|---|
| 1 | General Marketing | CREATING THAT PERSONALIZED GREETING CARD FOR SOMEONE SPECIAL TAKES ONLY A FEW MOMENTS . . . TOUCH THE GREEN BUTTON AT ANY TIME TO START. |
| 2 | General Marketing | SEND THAT SPECIAL SOMEONE A GREETING CARD UNLIKE ANYTHING THEY'VE EVER SEEN BEFORE . . . REMEMBER THERE IS NO CHARGE UNLESS YOU DECIDE TO PRINT . . . TOUCH THE GREEN BUTTON TO START. |
| 3 | Halloween Marketing | (Wicked witches laugh) . . . NEVER MIND HER . . . SHE'S JUST MAD BECAUSE NO ONE SENT HER A PERSONALIZED CARD FOR HALLOWEEN . . . JUST TOUCH THE GREEN BUTTON AND BEWITCH YOUR FRIENDS. |
| 4 | Thanksgiving Marketing | DON'T BE A TURKEY . . . SHOW THAT SPECIAL SOMEONE HOW THANKFUL YOU ARE THAT THEY'RE YOUR FRIEND . . . SEND THEM A PERSONALIZED CARD THIS THANKSGIVING . . . TOUCH THE GREEN BUTTON TO START. |
| 5 | Holiday Marketing | IF YOU CAN'T BE THERE THIS HOLIDAY SEASON, SHOW THEM HOW MUCH YOU CARE BY CREATING A CARD JUST FOR THEM . . . TOUCH THE GREEN BUTTON TO START. |
| 6 | Holiday Marketing | CREATE A KEEPSAKE THIS HOLIDAY SEASON THEY'LL TREASURE FOR YEARS . . . JUST TOUCH THE GREEN BUTTON TO START. |
| 7 | Holiday Marketing | MAKE THIS HOLIDAY PERSONAL . . . CREATE A UNIQUE CHRISTMAS, CHANUKAH OR NEW YEARS CARD THAT SAYS IT . . . THE WAY YOU WANT IT SAID . . . TOUCH THE GREEN BUTTON TO START. |
| 8 | Holiday Party Marketing | HAVING A PARTY THIS HOLIDAY? . . . SURPRISE YOUR GUEST WITH A SPECIAL INVITATION CREATED JUST FOR THEM . . . TOUCH THE GREEN BUTTON TO START. |
| 9 | Marketing | WHY SETTLE FOR THAT SAME OLD KIND OF CARD YOU SEND EVERY TIME? . . . SURPRISE THAT SOMEONE SPECIAL WITH A PERSONALIZED CARD . . . IT'S FUN . . . EASY . . . AND TAKES ONLY A FEW MOMENTS . . . REMEMBER, THERE IS NO CHARGE UNLESS YOU DECIDE TO PRINT. |
| 10 | Button Help | ANSWER THE QUESTION AT THE TOP OF EACH PAGE BY TOUCHING THE BUTTON OF YOUR CHOICE . . . IF YOU CHANGE YOUR MIND, OR MAKE A MISTAKE, DON'T WORRY, TOUCH THE GRAY "PREVIOUS PAGE" BUTTON AND MAKE YOUR NEW SELECTION. |
| 11 | Keyboard Help | GENTLY TOUCH EACH LETTER UNTIL THE INFORMATION AT THE TOP OF THE PAGE IS CORRECT . . . IF YOU MAKE A MISTAKE OR CHANGE YOUR MIND, USE THE "BACKSPACE BUTTON" . . . WHEN YOU ARE FINISHED, TOUCH THE GREEN "OK TO PROCEED" BUTTON. |
| 12 | Keyboard Error | YOU HAVE EXCEEDED THE MAXIMUM OF [25] CHARACTERS . . . IF YOU WISH TO MAKE ANY CHANGES, USE THE BACKSPACE BUTTON. |
| 13 | Number Help | GENTLY TOUCH EACH NUMBER UNTIL THE INFORMATION AT THE TOP OF THE PAGE IS CORRECT . . . THEN TOUCH THE GREEN "OK TO PROCEED" BUTTON. |
| 14 | Number Error | THAT DATE DOES NOT EXIST . . . TOUCH THE CLEAR BUTTON . . . ENTER A VALID DATE . . . THEN TOUCH THE GREEN "OK TO PROCEED" BUTTON. |
| 15 | Post Printing | WHEN YOUR CARD HAS FINISHED PRINTING, LIFT THE HANDLE AND REMOVE IT . . . FOLD YOUR CARD TOP TO BOTTOM FIRST, AND THEN SIDE TO SIDE . . . BE SURE TO TAKE AN ENVELOPE LOCATED IN THE BOX TO YOUR RIGHT . . . IF YOU WISH TO CREATE ANOTHER CARD, TOUCH THE GREEN BUTTON NOW. |
| 16 | Post Printing | WHEN YOUR CARD HAS FINISHED PRINTING, FOLD IT TOP TO BOTTOM FIRST, AND THEN SIDE TO SIDE . . . BE SURE TO TAKE AN ENVELOPE LOCATED IN THE BOX TO YOUR LEFT . . . IF YOU WISH TO CREATE ANOTHER CARD, TOUCH THE GREEN BUTTON NOW. |

The above voice text files are recorded and digitally stored on a hard disk. Programs that allow the recording and playback of any recordable sounds are also currently available. In normal use of a digitized sound file, the entire file is played back in full before any other action can be taken. In the present system application, however, the program must sense if a touch is being made on the touch screen bezel 16 during loading and playback of the sound. The digitized sound files in the present system further complicate the matter by their relatively large size. To obtain the clearest recording possible, the sound sampling rate should be set in the high range of possible sampling rates. The system flow detailed in FIGS. 29–33 provides a solution to both of these mentioned problems.

In order to provide the system with information necessary to control the order of graphic instructional displays and actions to take, each graphic file used is defined in the following manner:

Graphic File Name

Screen Number—Uniquely identifies each graphic

File Description

Prior Screen Number—Identifies which screen to back up to when requested

More Screen Numbers (4)—Identifies additional same level screens that are used when the original is too full (as many as, e.g., 60 identifiable touch points or "buttons" can be defined per screen area with 4 additional "more" screens (e.g., FIG. 7), that is, a total of 5 screens are available for any selection to be made at a given level)

Button Variables—as many as 60 can be defined per screen

Button Number

Upper Left X,Y screen coordinates

Lower Right X,Y screen coordinates

Action Code—Defines the next action to take for this button

Next Screen—defines the next screen to display for this button

Figure 20:
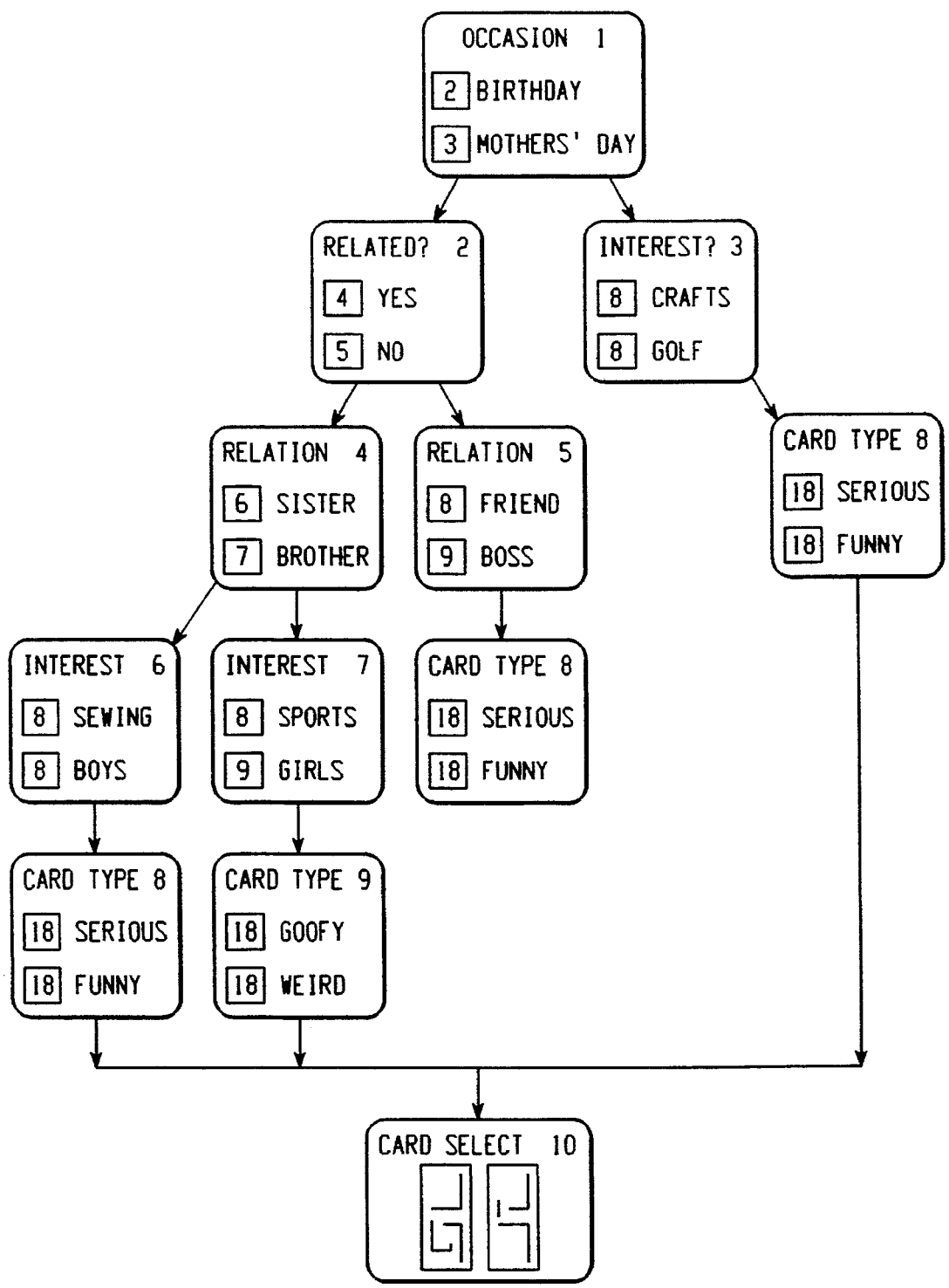
FIG. 20 is a flow chart representing two different card selection or sort routines only one of which is initiated in response to selection of one of two different occasions.
Figure 21:
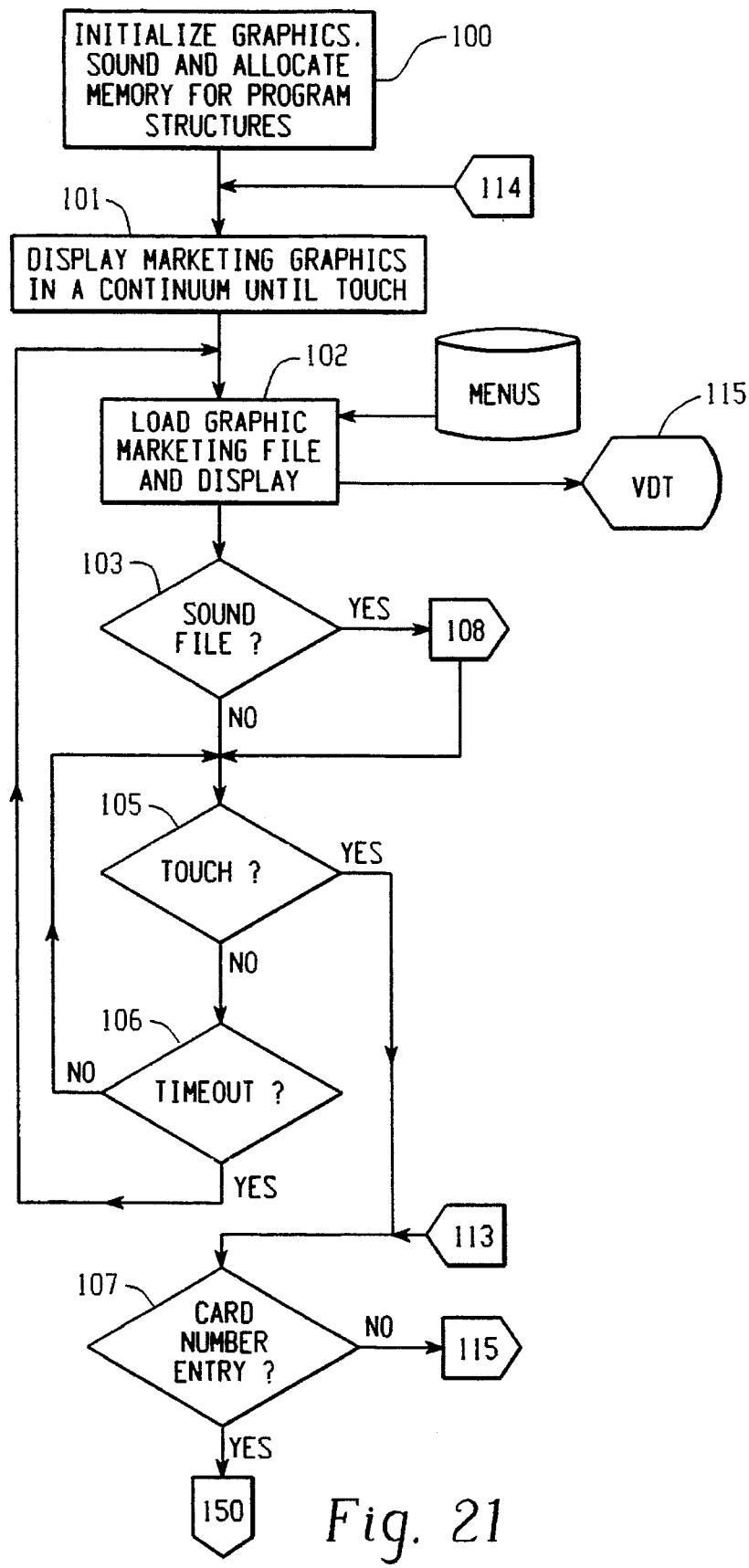

The above scheme of graphic file definition permits the order of presentation and actions that occur when a given button is touched, to be modified easily. Importantly, as illustrated in FIG. 20, the order in which the screens are presented can be differentiated by the particular occasion selected, thus to ensure that only necessary and appropriate category selections are subsequently presented for display to the customer 12. Therefore, the customer need only select from those items that are relevant to the selected occasion, instead of wading through an imposing number of unrelated items prior to finding one he or she wishes to select.

In the overall screen menu flow shown in FIG. 20, the top box, occasion screen (1), has two defined screen touch zones that have different next screens defined as (2) and (3). Upon touching either Birthday or Mother's Day "buttons" appearing in the occasion screen, a different route to card selection is followed. In the Mother's Day example, the relationship screens (2), (4) and (5) would not be applicable so any such screens are bypassed. In case of a Birthday occasion, the interests presented (6) and (7) are different for brother and sister selections as well.

Each card stored in the system also has a graphic screen. The card screens are defined by an alternate method. The following is a definition of the parameters for each card screen:

Graphic File Name

Card Number—Uniquely identifies each card

Card Description

Category Codes (6)—The specific combination of codes place the card in a unique category Optional Variables—as many as 10 can be defined Option Used—Existence defines use and justification on output Option Description Code Screen Display X,Y coordinates Screen Font Color Screen Font Size Plotter X,Y coordinates Plotter Font Size Font Number—If the number is negative the output is inverted Plotter Font Color Customization Screen Number—defines the screen that the option is entered via or selected from The above definition scheme provides the ability to group cards presented to the customer based on selections made through the menu system. By using this technique of selection and presentation, the customer 12 can be very specific regarding the card that he or she wishes to purchase and without having to spend precious time browsing through endless card racks.

A final card is produced on the printer device 24 which may be in the form of an eight pen plotter. The card is produced using a file that contains detailed plotter instructions for the card and is stored on the hard disk of the computer 20. Many printing systems have fonts developed for their use that can be downloaded to printer storage for application use. For plotter fonts, however, this is not the case. Reproducing fonts for optional text to be printed on a card, so as to match fonts used in the card as pre-stored, is overcome by storing the plotter instructions, along with the necessary parameters, in a disk file. This file has one definition for each character that could be used. The size of each character output can be varied by the program of FIGS. 21–28 to reflect the size requested in the card option definition. FIGS. 35 to 38 show the sequence of system operations providing an output of variable-sized plotter fonts.

Detailed Program Description

Figure 4:
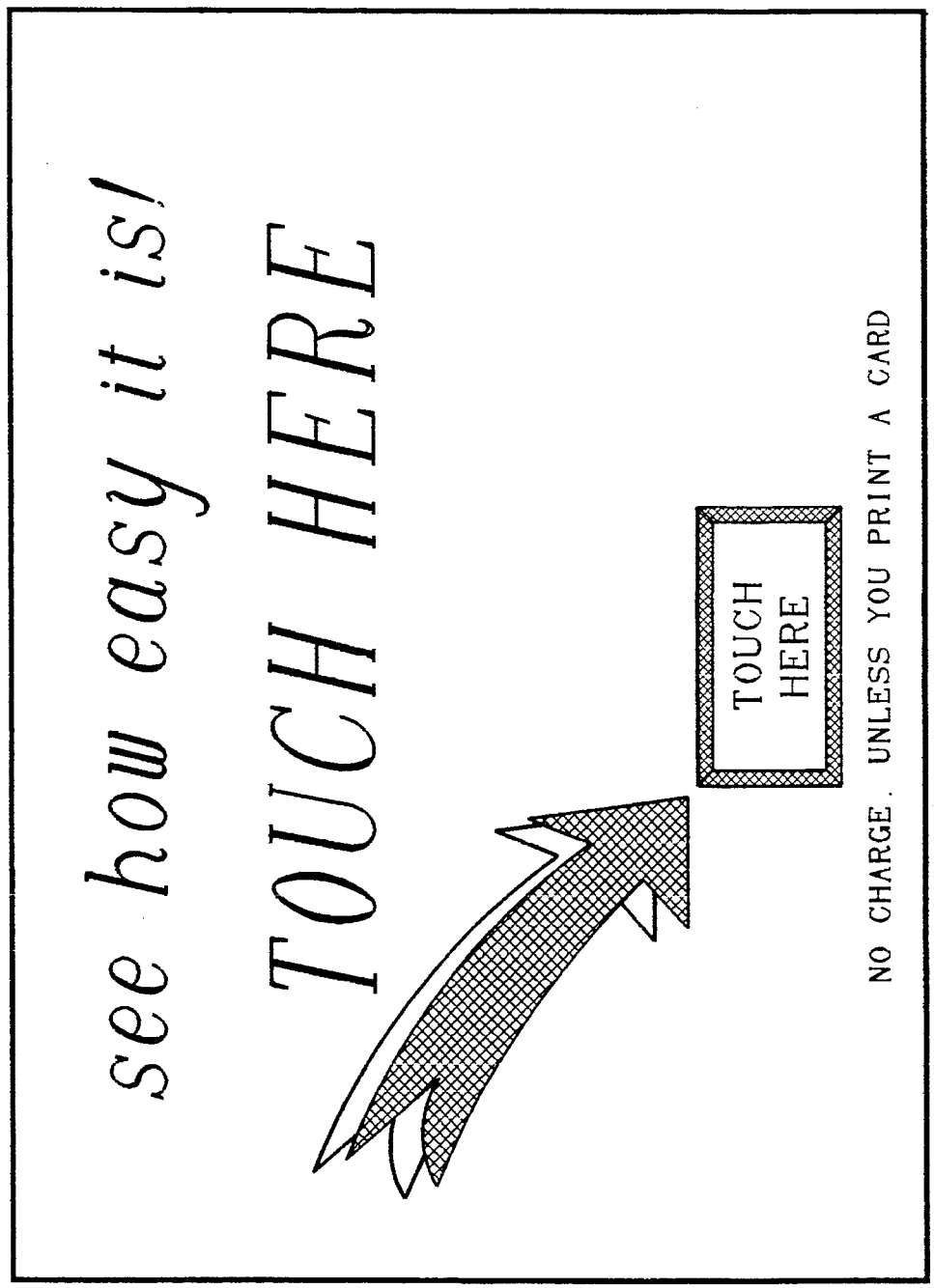
Figure 5:
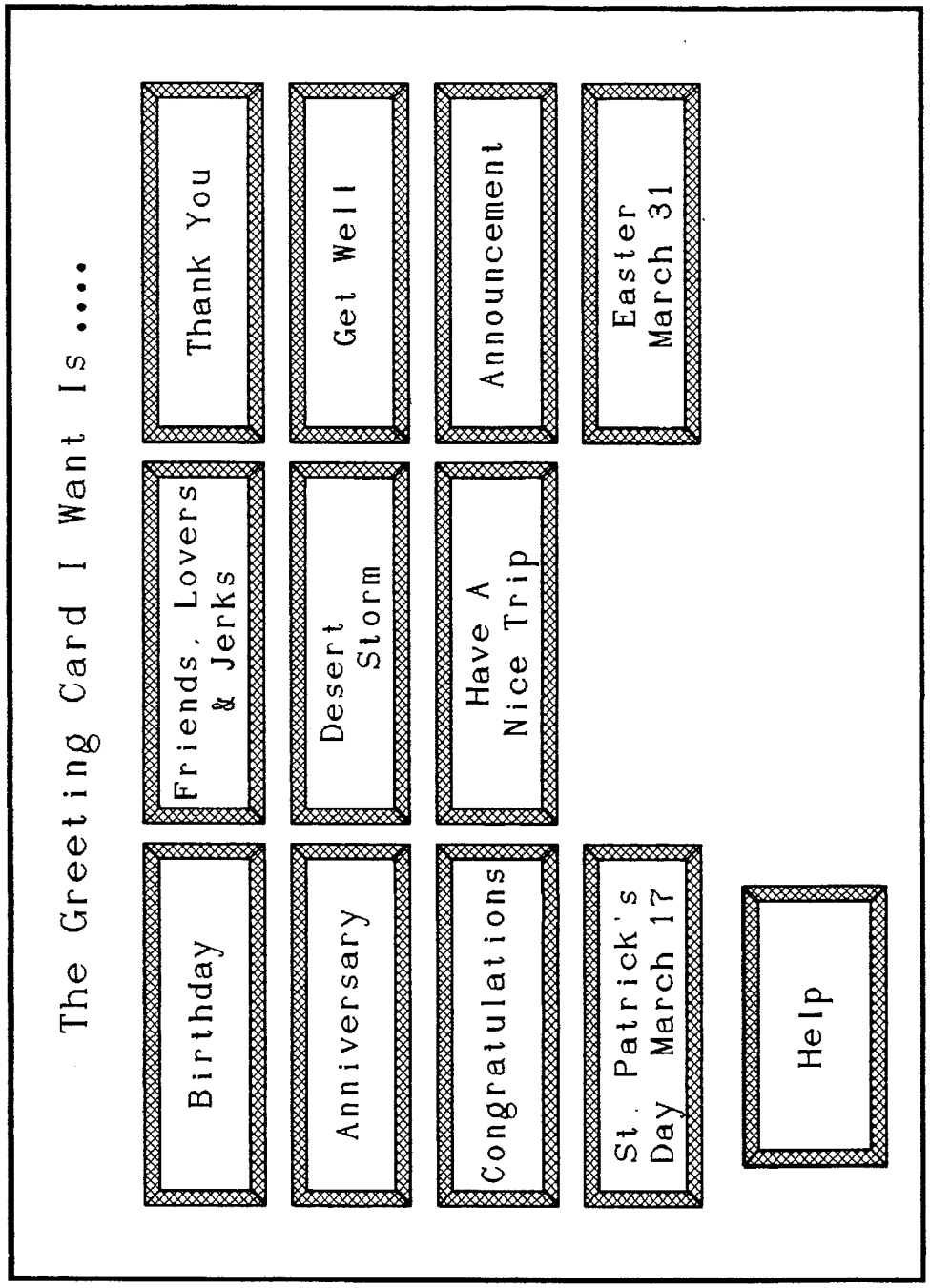

As shown by FIGS. 21–28, system operation begins by presenting a recurring display of graphic images (steps 101 through 106). These marketing presentations such as in FIG. 4 are intended to attract the attention of customers passing by the unit. After each marketing graphic file is loaded from the hard disk into memory and displayed on the monitor 14 (step 115), the program, at step 103, checks for the existence of a sound file that corresponds to the current graphic image. This process of matching graphic displays with any associated sound file occurs every time that an image is displayed throughout the program. If a sound file exists it is then read from the hard disk into memory and then "played" through audio hardware including speaker 42, attached with a special adapter to the computer's parallel port (step 112).

During the process of loading and playing the sound file, a touch on the monitor screen can interrupt the process at any point, as mentioned above. This situation is shown in detail in FIGS. 29 to 34. The recurring marketing display (step 101 in FIG. 21) can be affected by two actions. Each screen is defined to allow a variable display hold time of up to ten seconds. If this period of delay lapses without a valid touch of the button, then the next screen, as defined by the first button, is displayed. In case the button is touched, the card selection process begins.

Figure 26A:
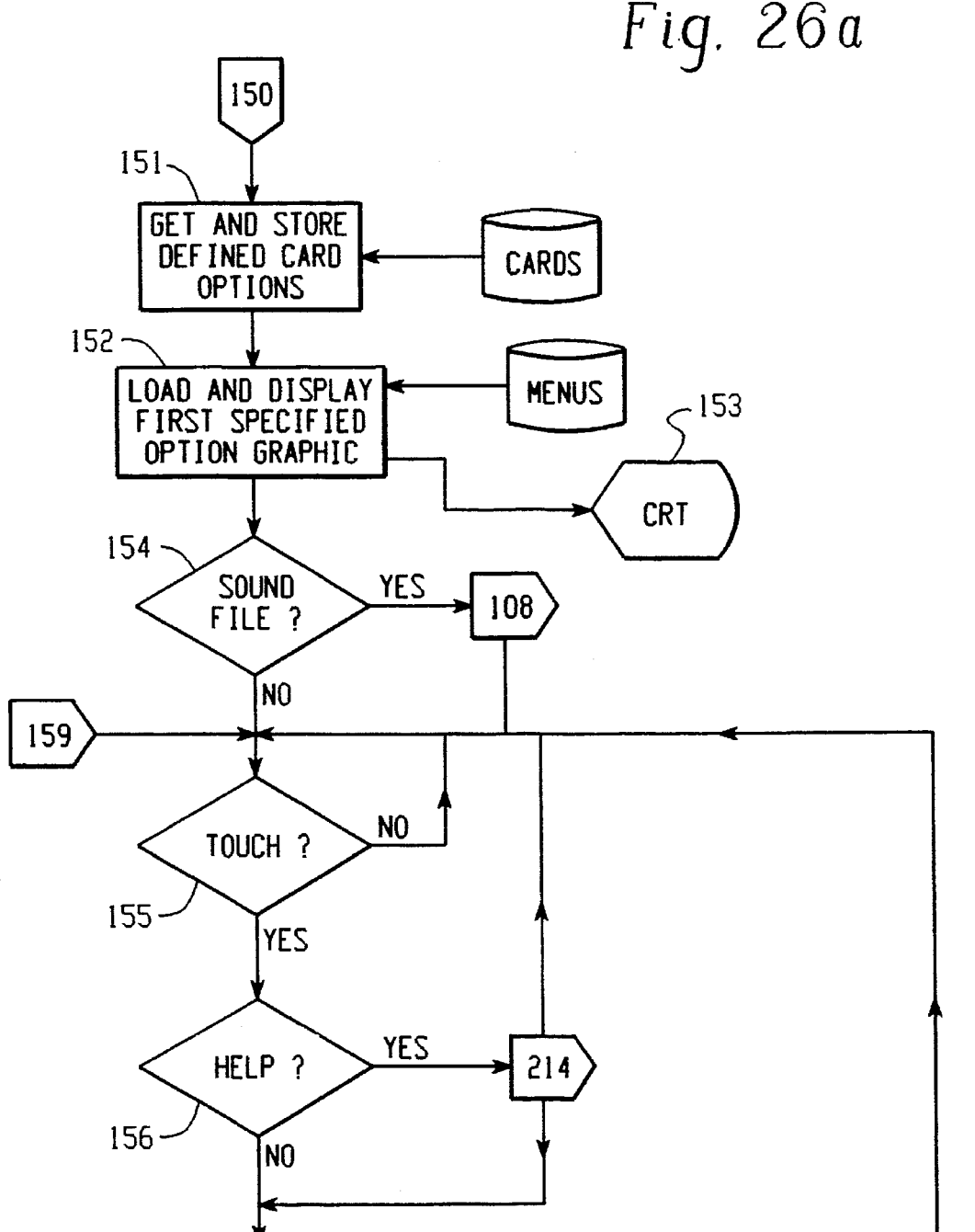
Figure 26B:
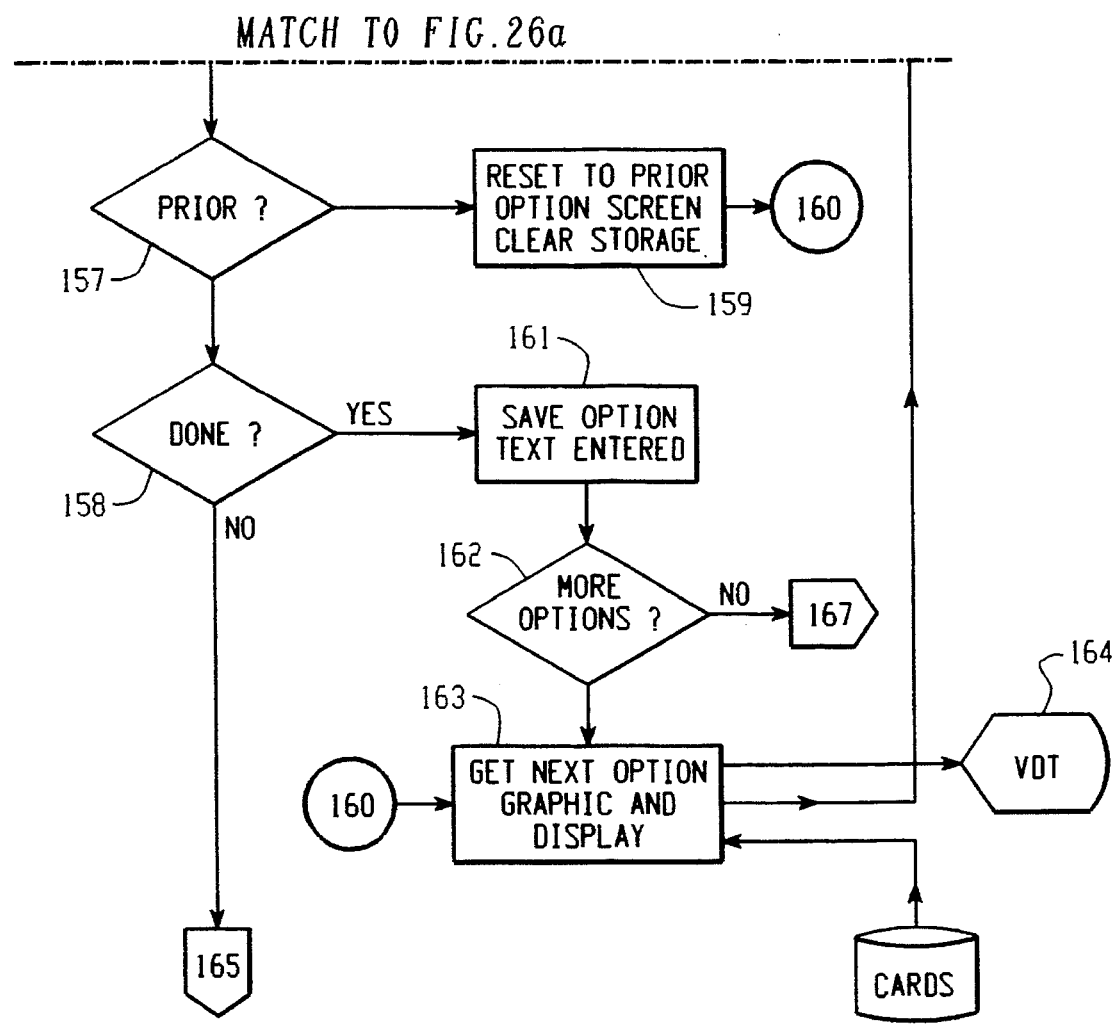
Figure 27:
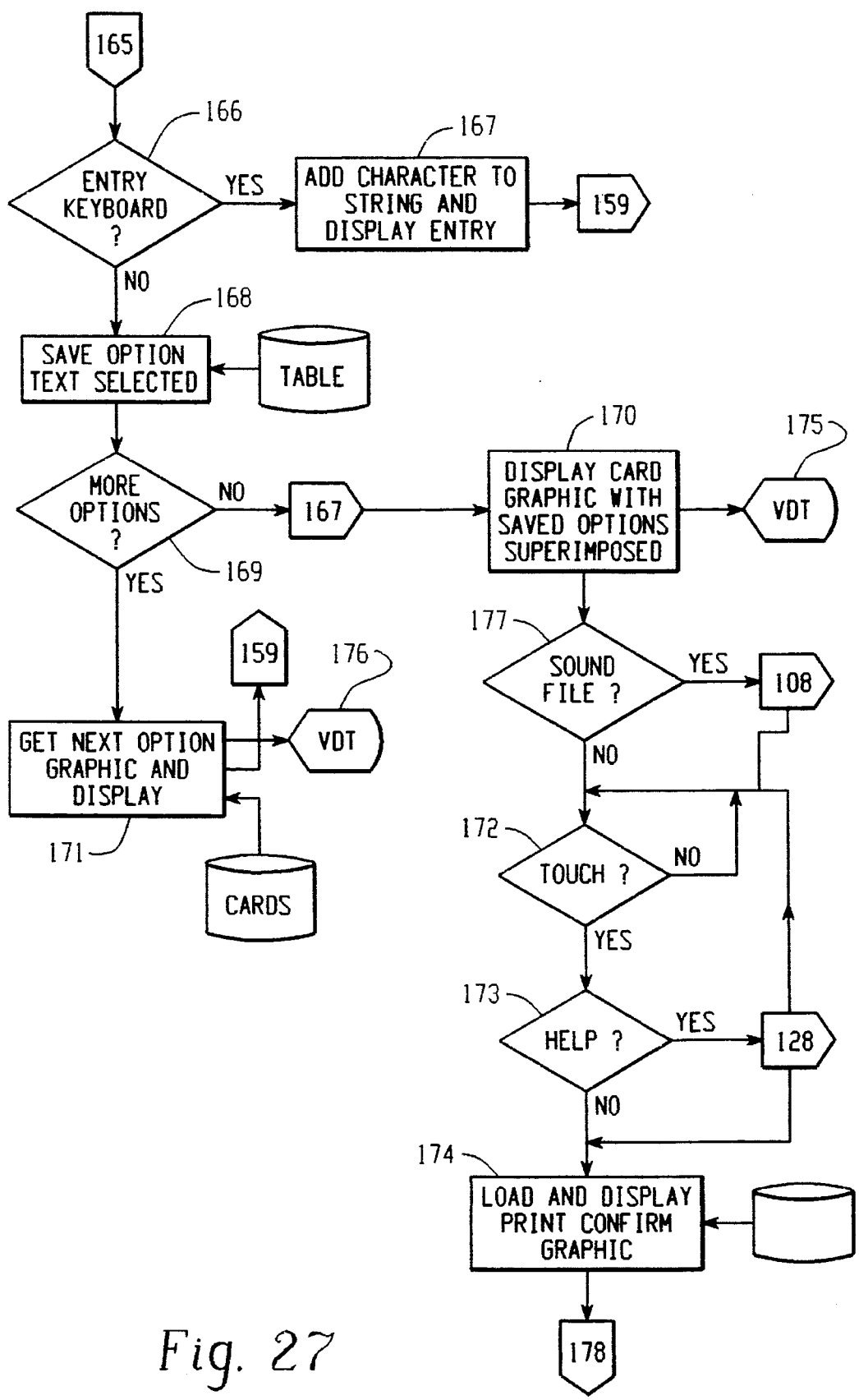
Figure 28:
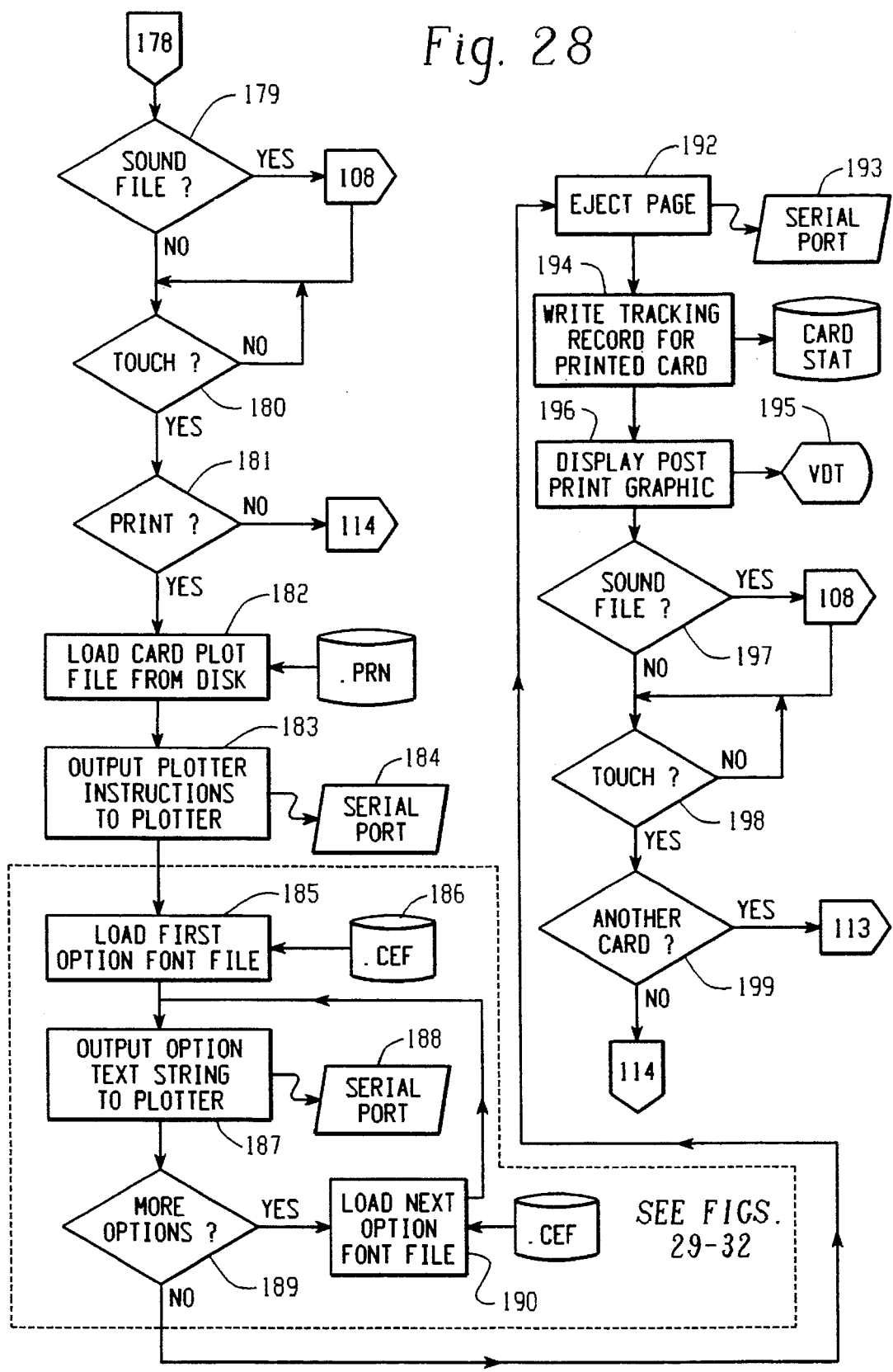
Figure 29:
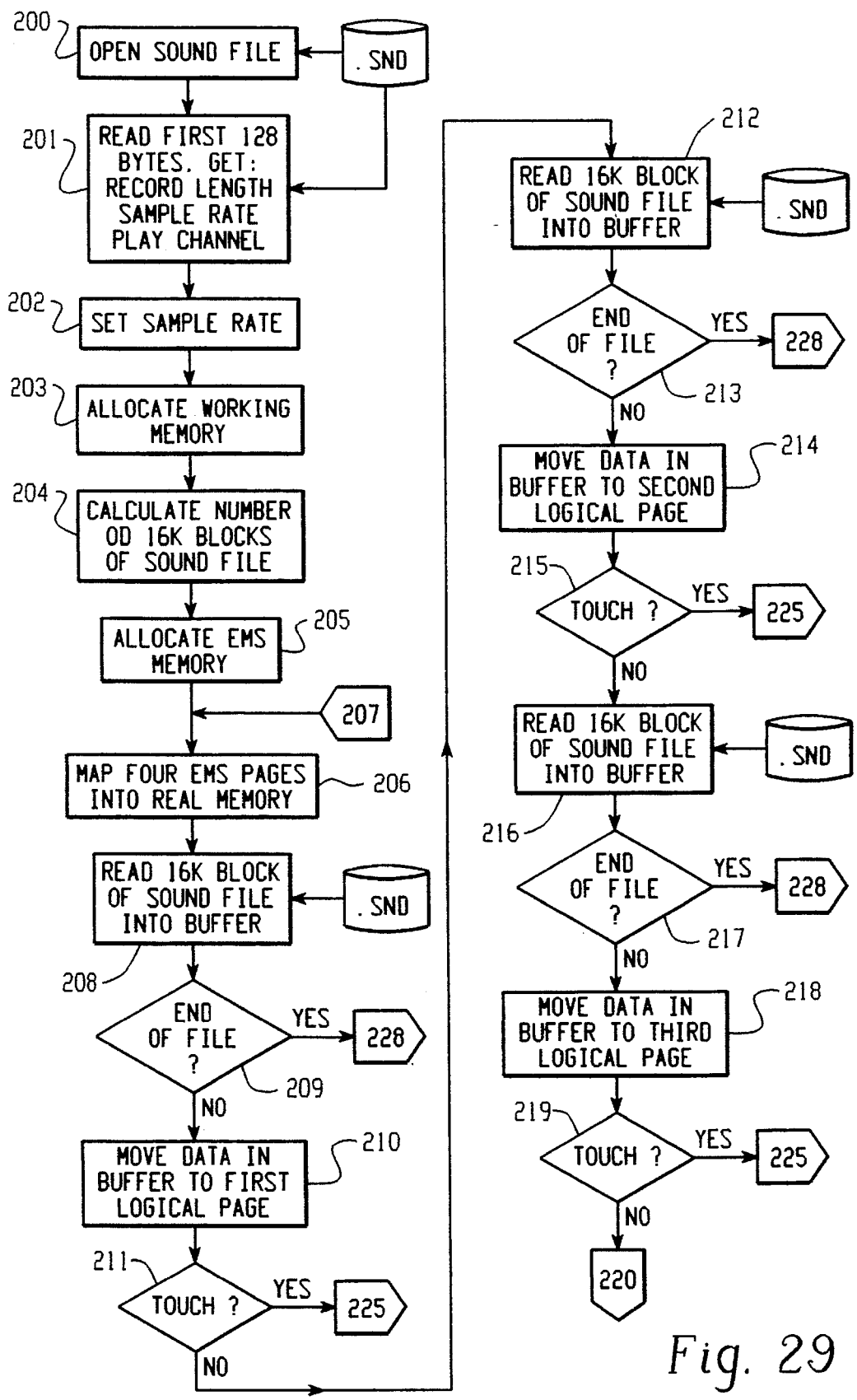
Figure 30:
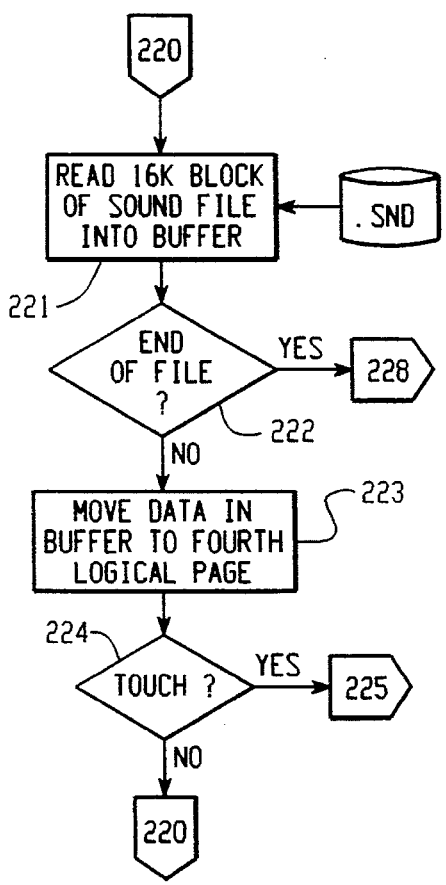
Figure 31:
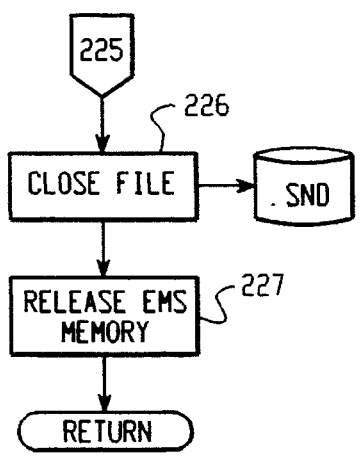
Figure 32:
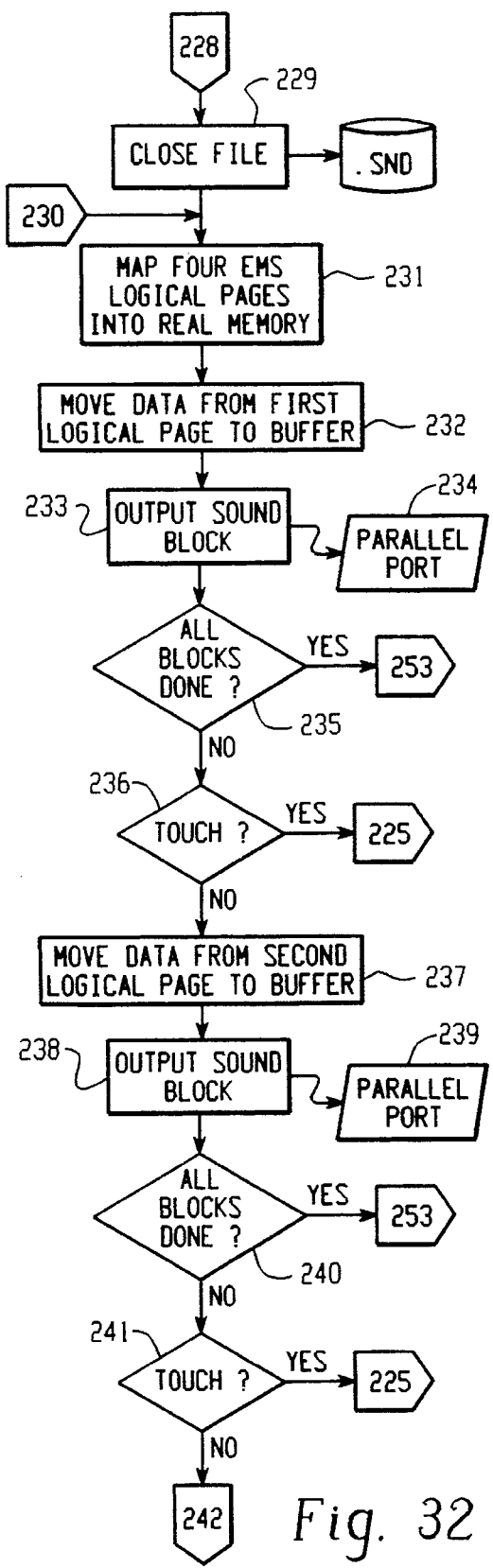
Figure 33:
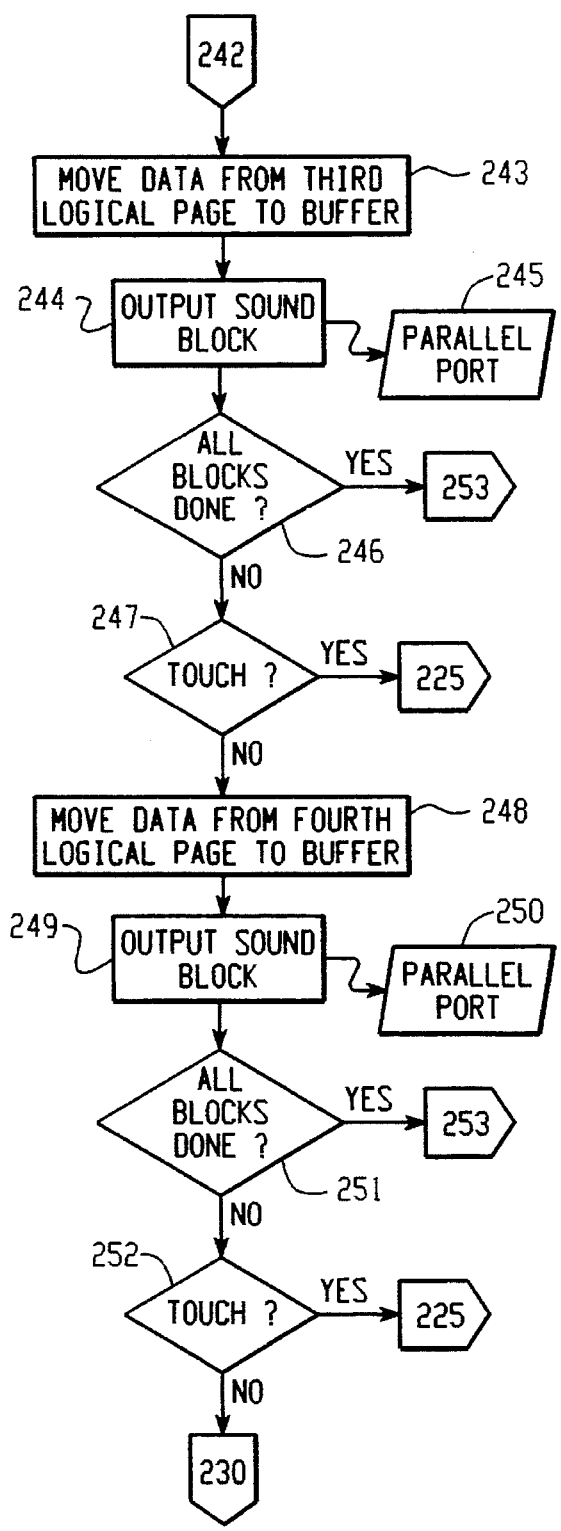
Figure 34:
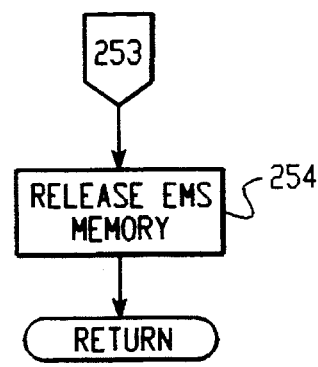

The selection process can be started one of two ways. The first, which may be optionally provided in the system as mentioned above, is via entry of a desired card's unique number as obtained, e.g., from the sample binder 52 in FIG. 1 or from a separate sample card display rack (not shown)

next to the terminal 10. Once a card number is entered, the process proceeds directly to card customization in step 151 (FIG. 26).

To begin card selection using only the monitor 14 for purposes of "sample" greeting card display, one or more graphic images that offer a choice of defined applications or occasions is presented on the monitor screen. See FIG. 5. At all displays within the program, control is provided by touching an appropriate "button" graphically displayed on the screen. See, e.g., FIGS. 4 to 17. With the exception of the recurring marketing display, there is a timeout built into the touch routine. That is, if there is no touch detected within a preset interval, the program automatically returns to the cycling marketing screens (Steps 101 to 106). From the occasion selection screen, as well as all other selection screens, several actions are possible.

Program step 119 defines processing of a help display. A particular help graphic display is defined in the screen number element of the help button definition. See, for example, the graphic "help" button in the screens of FIGS. 5 to 17. When a return button on a help screen is touched, the program redisplays the screen that was on the monitor 14 just prior to requesting the help screen. In step 120 (FIG. 23), the customer 12 can restart the process from any screen. This action will return to re-entry point 113 in FIG. 21.

Figure 23:
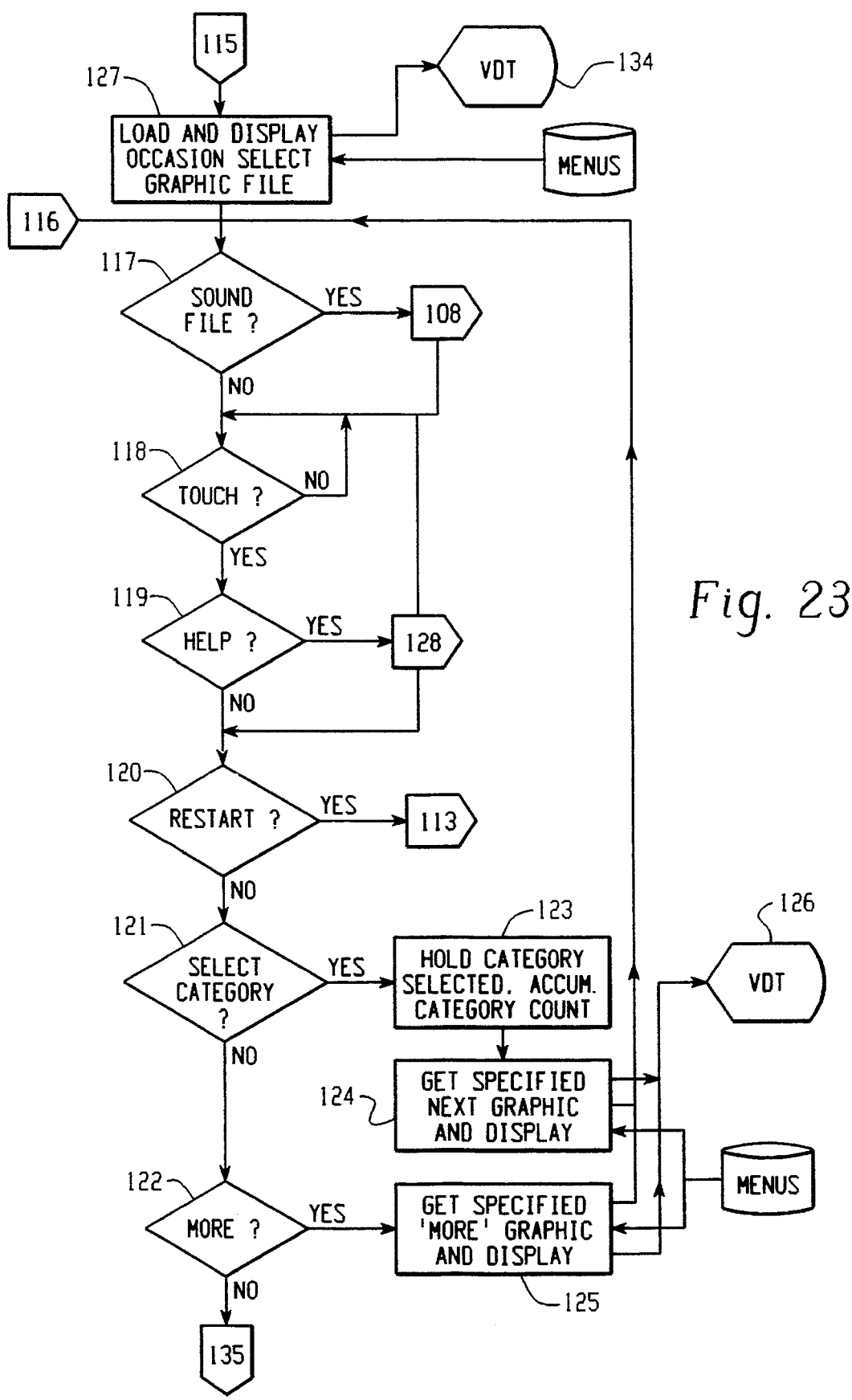

If the screen presents a choice of applications or categories, as shown starting in step 121 of FIG. 23, a category choice selected by the customer is saved in memory and a category counter is incremented. The specific category choice is contained in the action code element of the button definition and a certain next screen to display is identified. In the case of a "more" button selection as in FIG. 6 (button labeled "See More Relationships"), program step 122, the "more" button defines a new selection screen at the same level to display next such as the screen of FIG. 7. That is, the screens of FIGS. 6 and 7 each relate to selection of the relationship of the recipient of a greeting card to the sender, after a selection of the occasion for the card has been made on a previous screen such as the screen of FIG. 5.

Figure 25A:
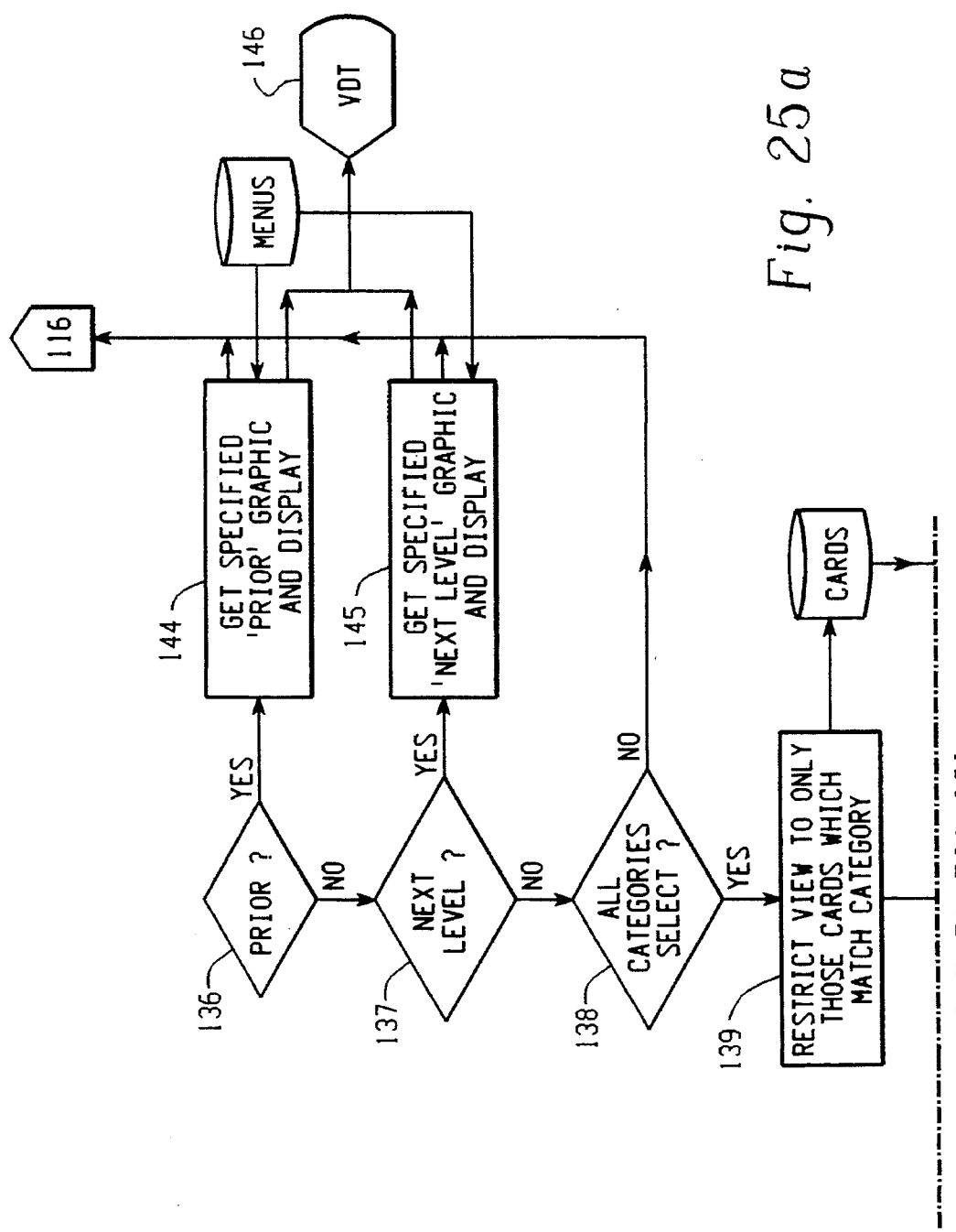
Figure 25B:
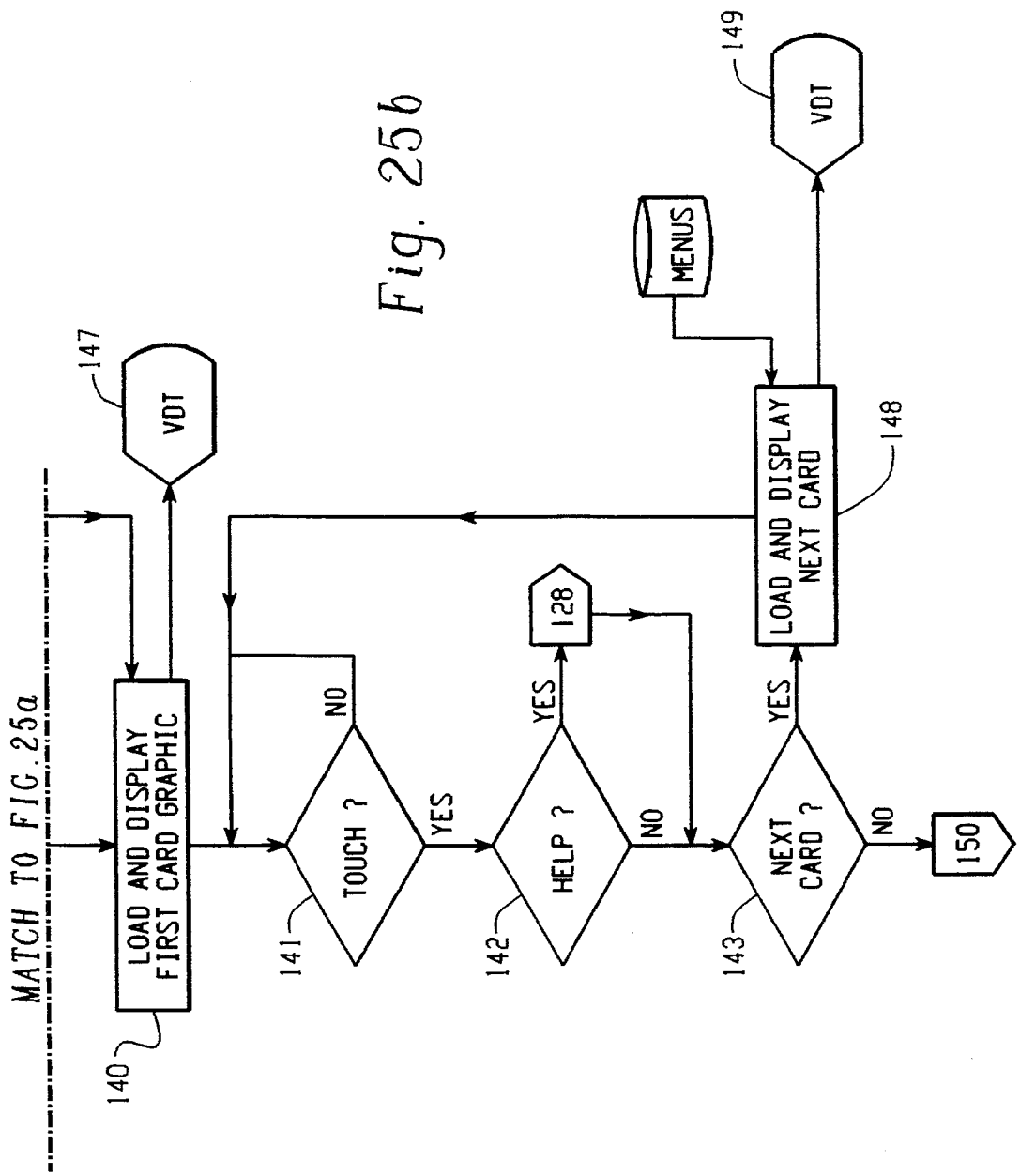

To reverse the menu flow, as traversed up to this point, the prior action may be taken from step 136 in FIG. 25. The screen defined in the prior screen number element of the current menu definition is displayed. At this point, any selection made is blanked and the counter decremented.

The next level procedure in program step 137 is utilized to navigate to a point where a final card format selection can be made. For example, an action from the occasion screen of FIG. 5 from the "Birthday" button will then cause display of a screens(s) of specific potential recipients such as FIGS. 6 and 7 where the relation of recipient selection is made. The process of making selections at specific levels is repeated until all level screens defined for the selected card application exhausted.

Figure 6:
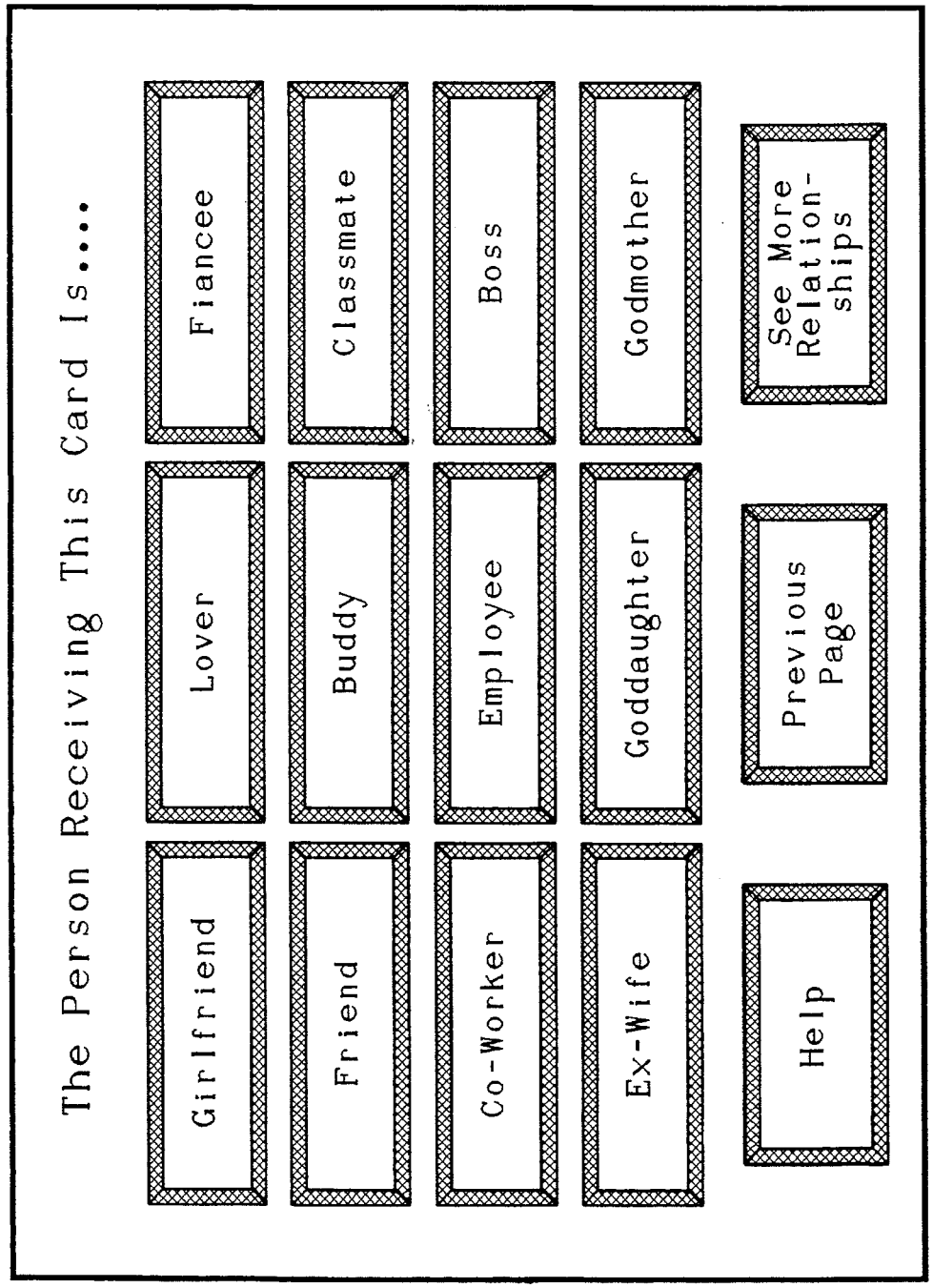
Figure 7:
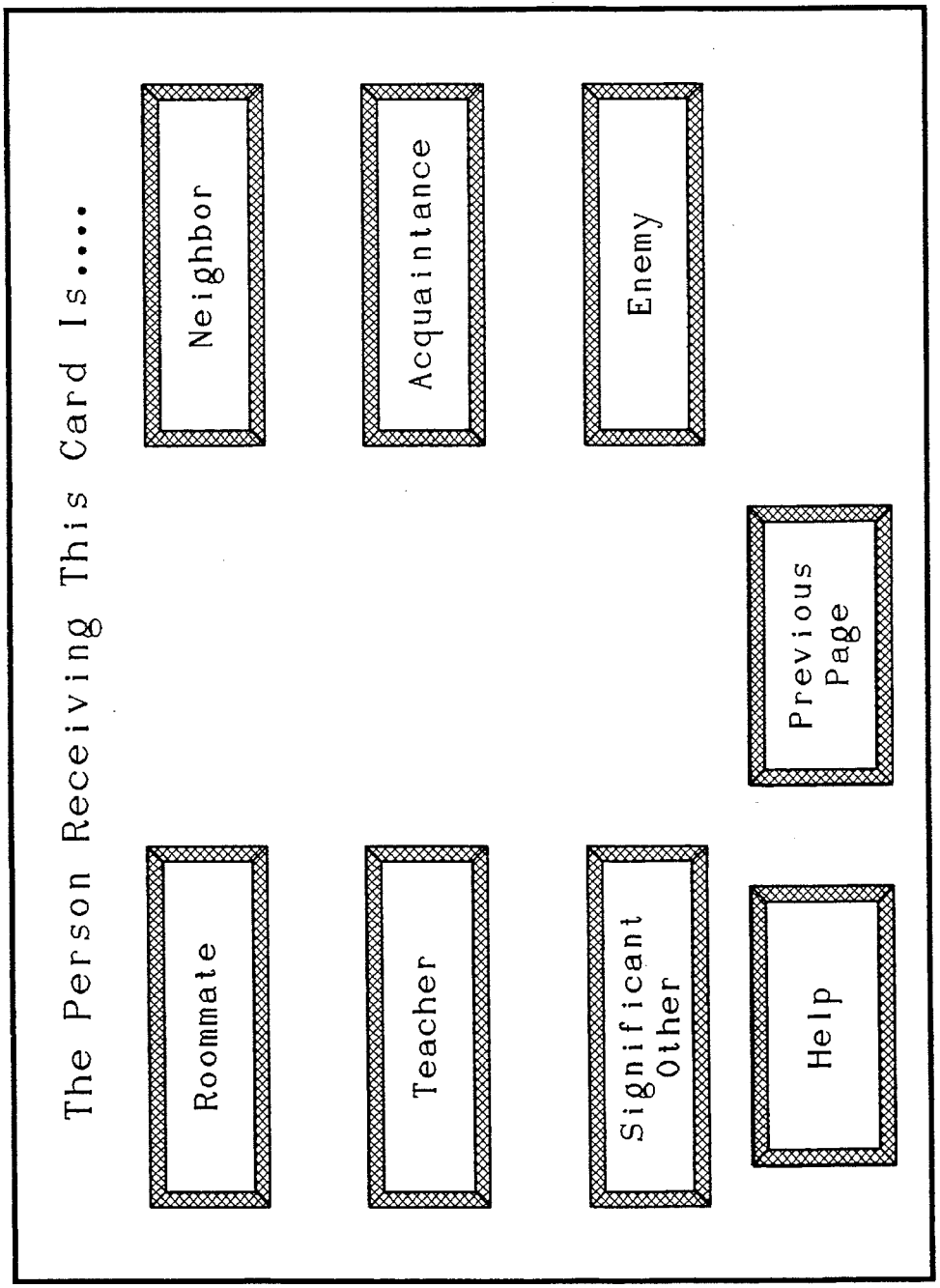
Figure 8:
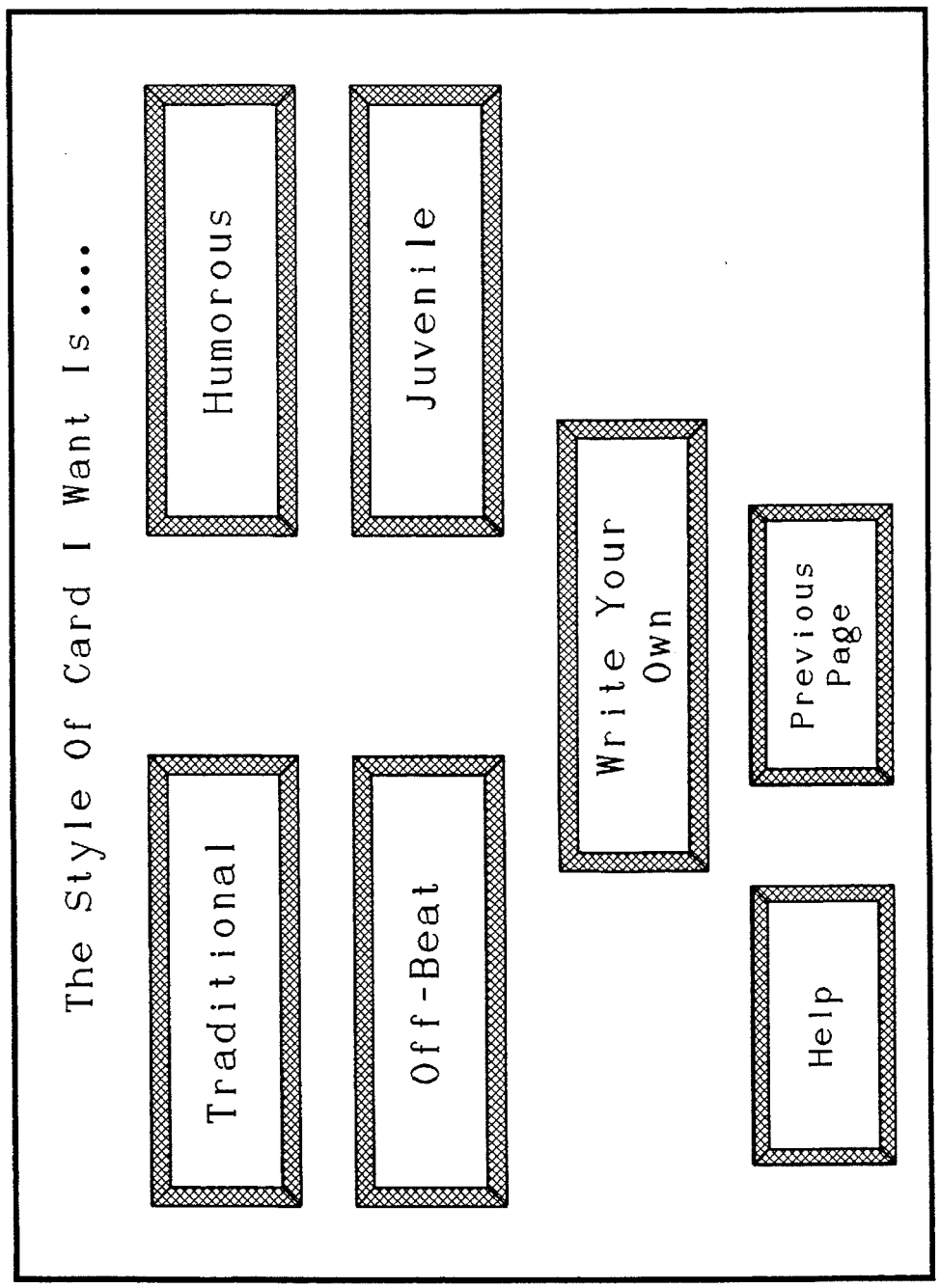
Figure 9:
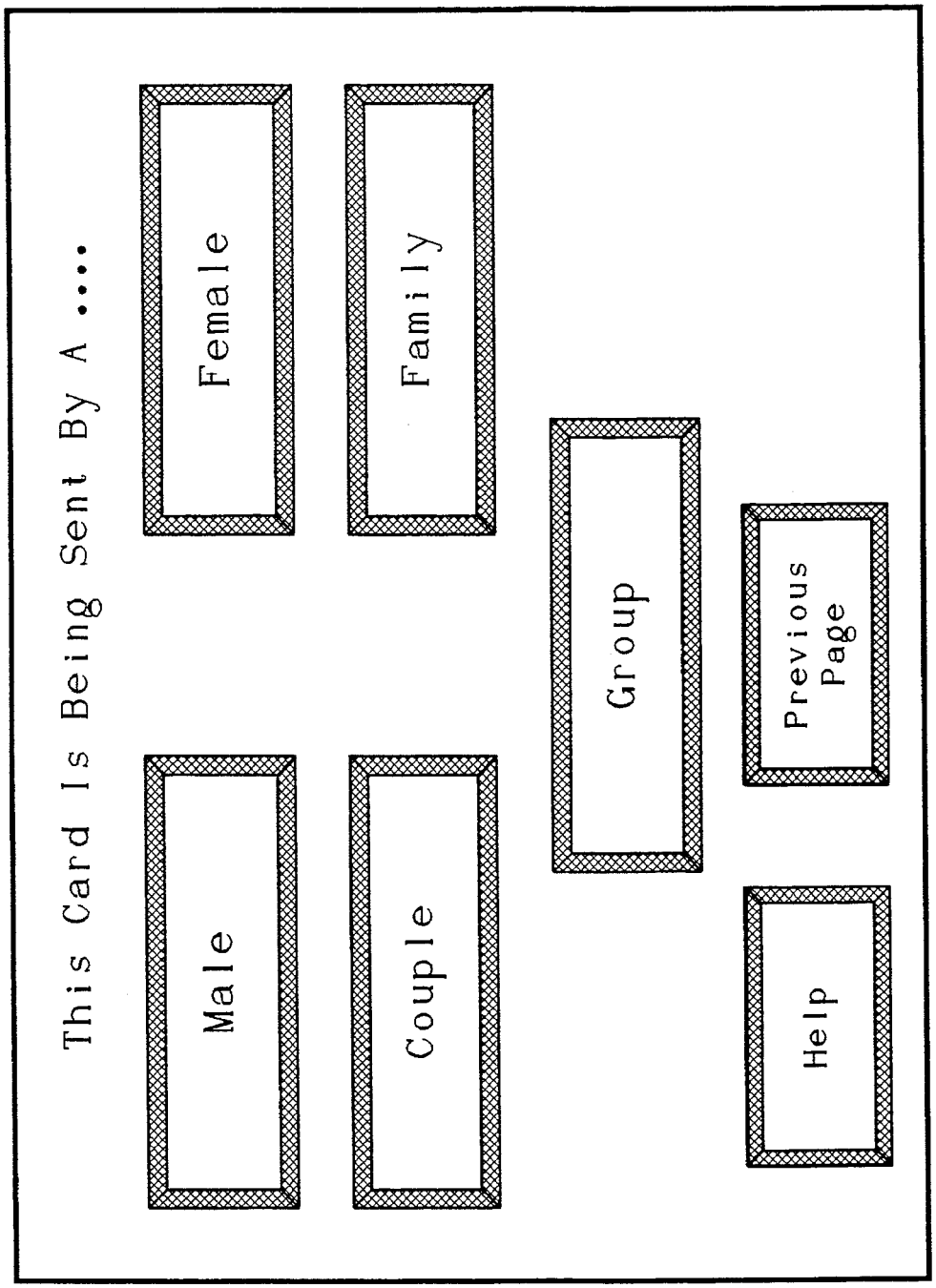
Figure 10:
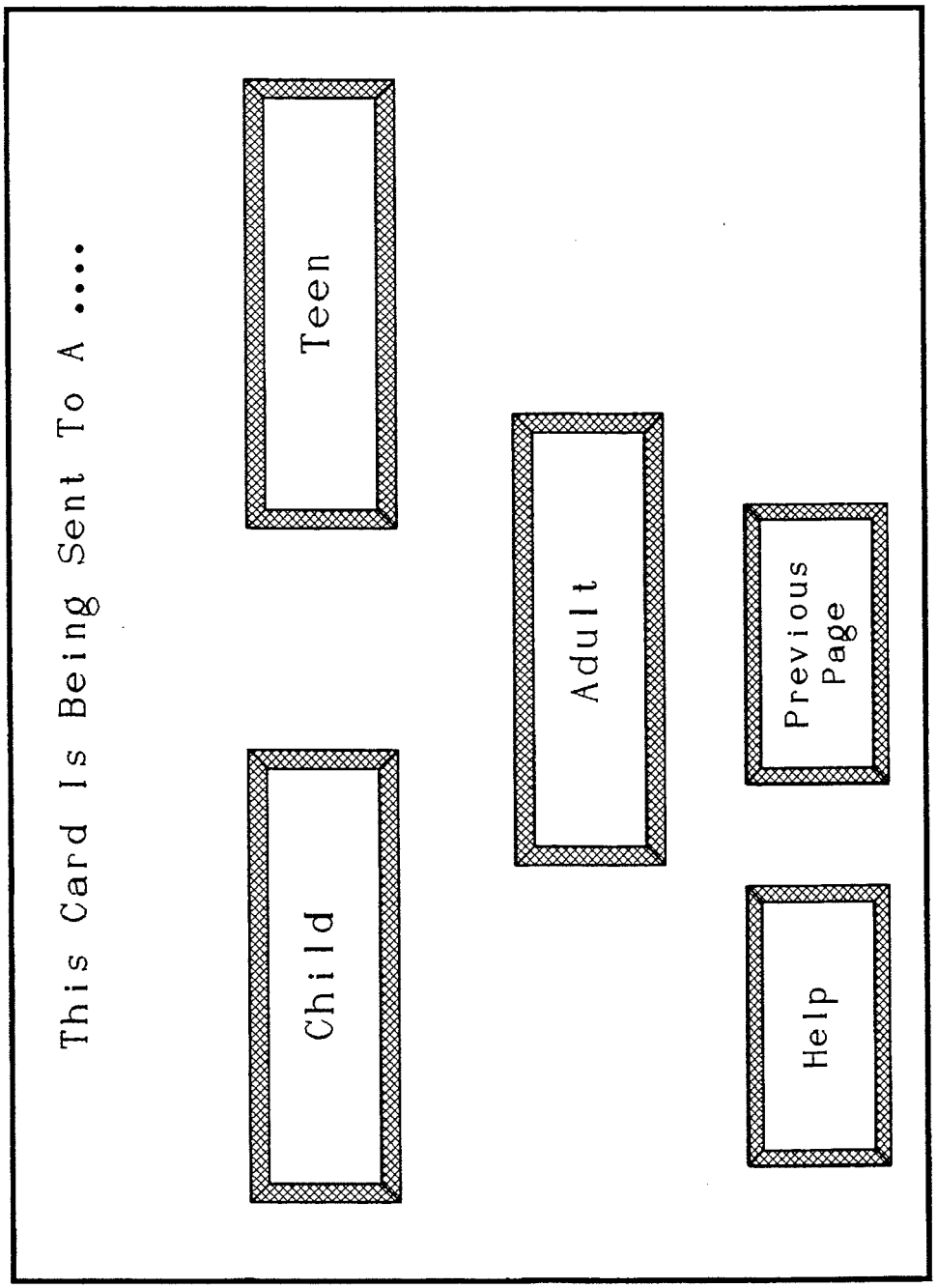

Different level screens that may be displayed in a determined order after a selection is made from the screens of FIGS. 6 and 7, are shown without limitation in FIGS. 8–10.

Figure 11:
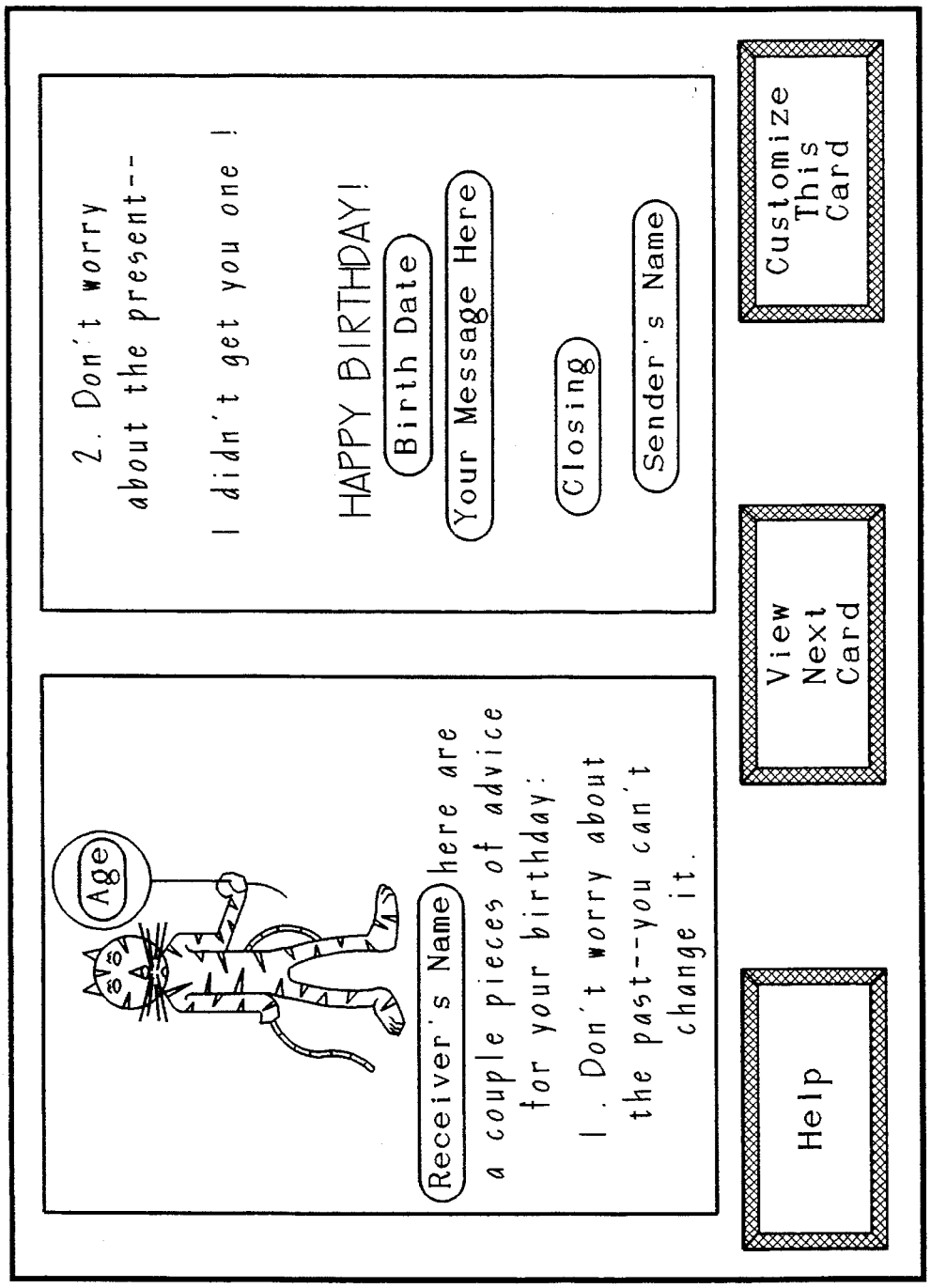
Figure 12:
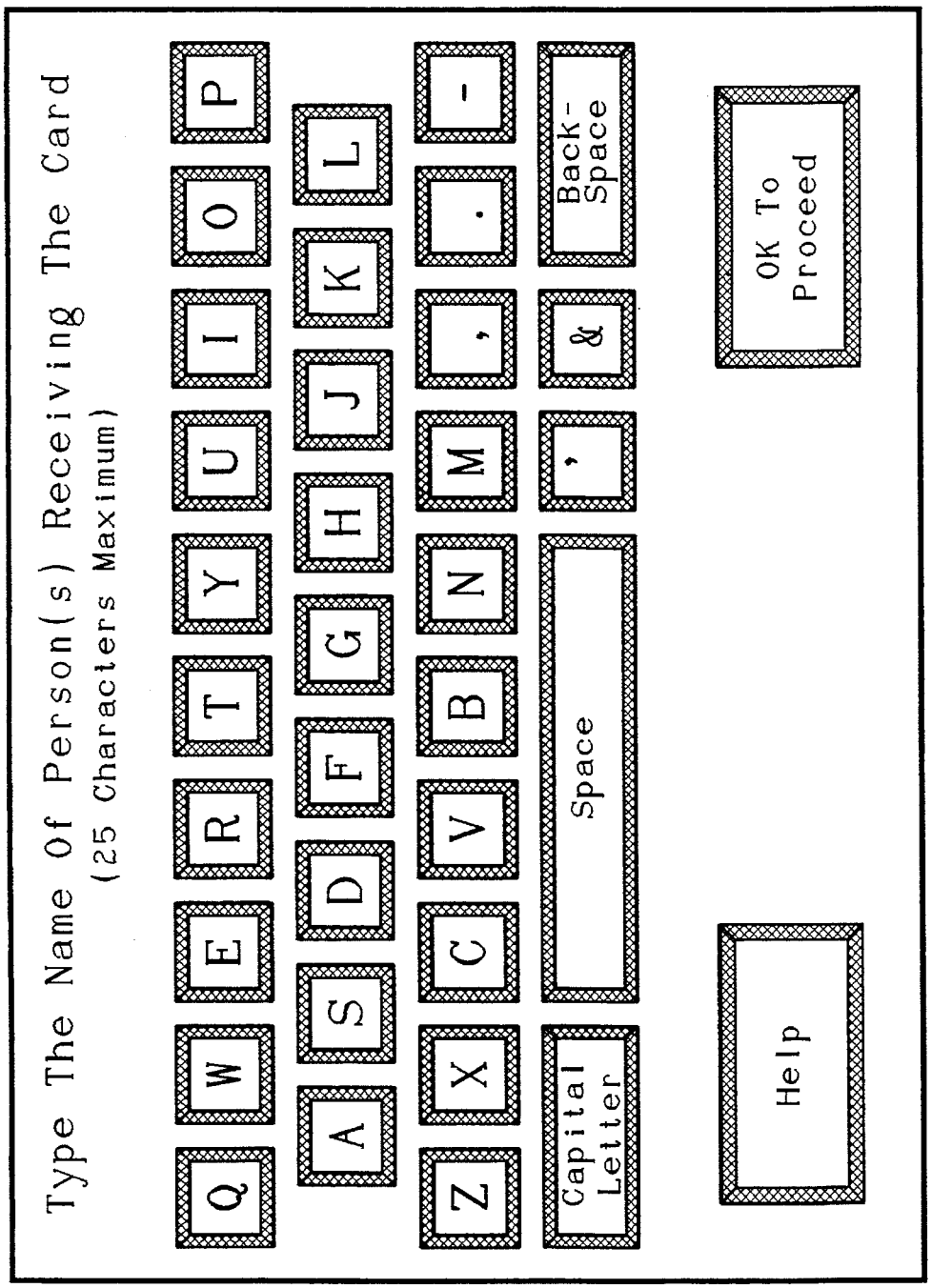
Figure 13:
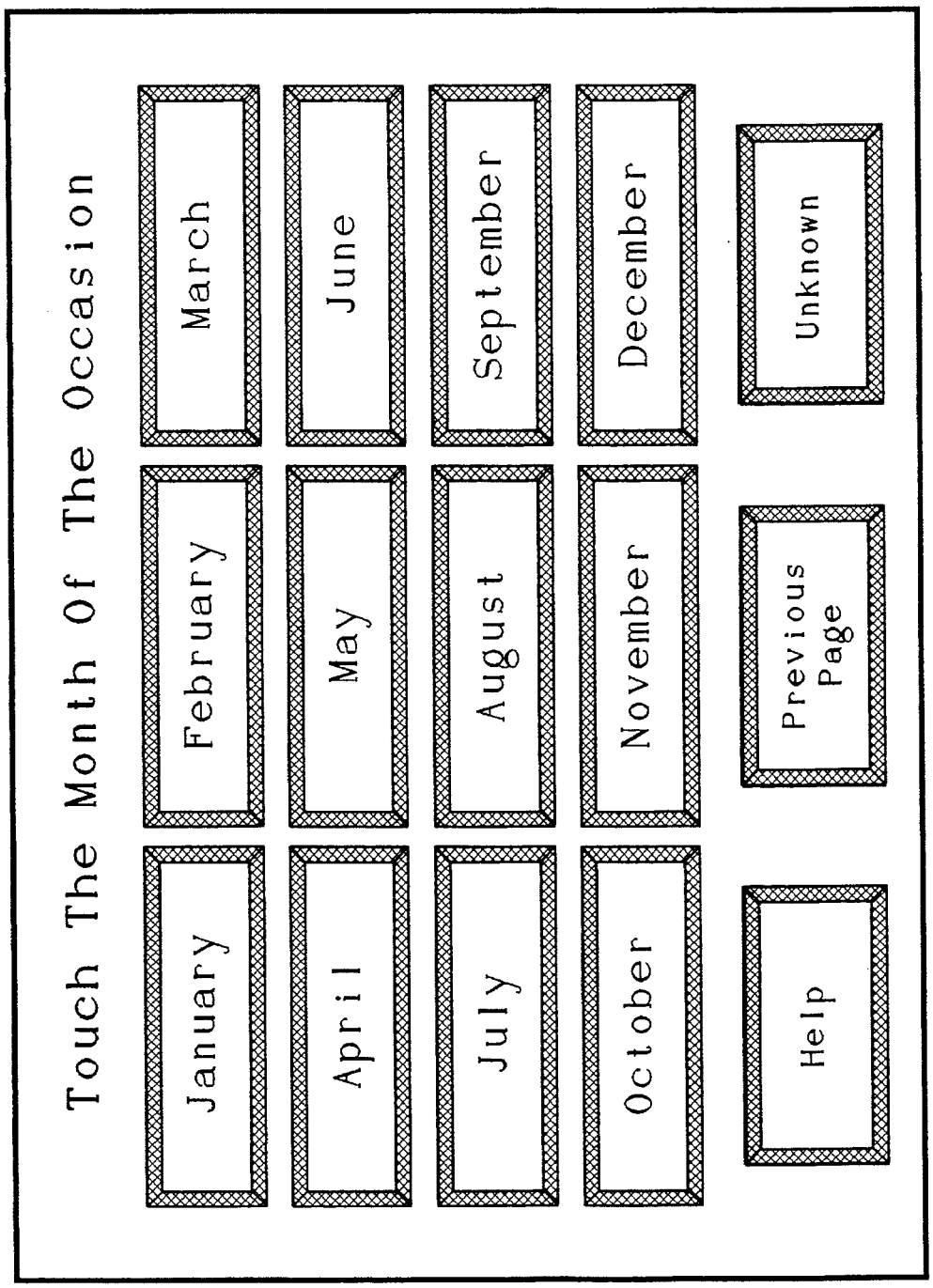
Figure 15:
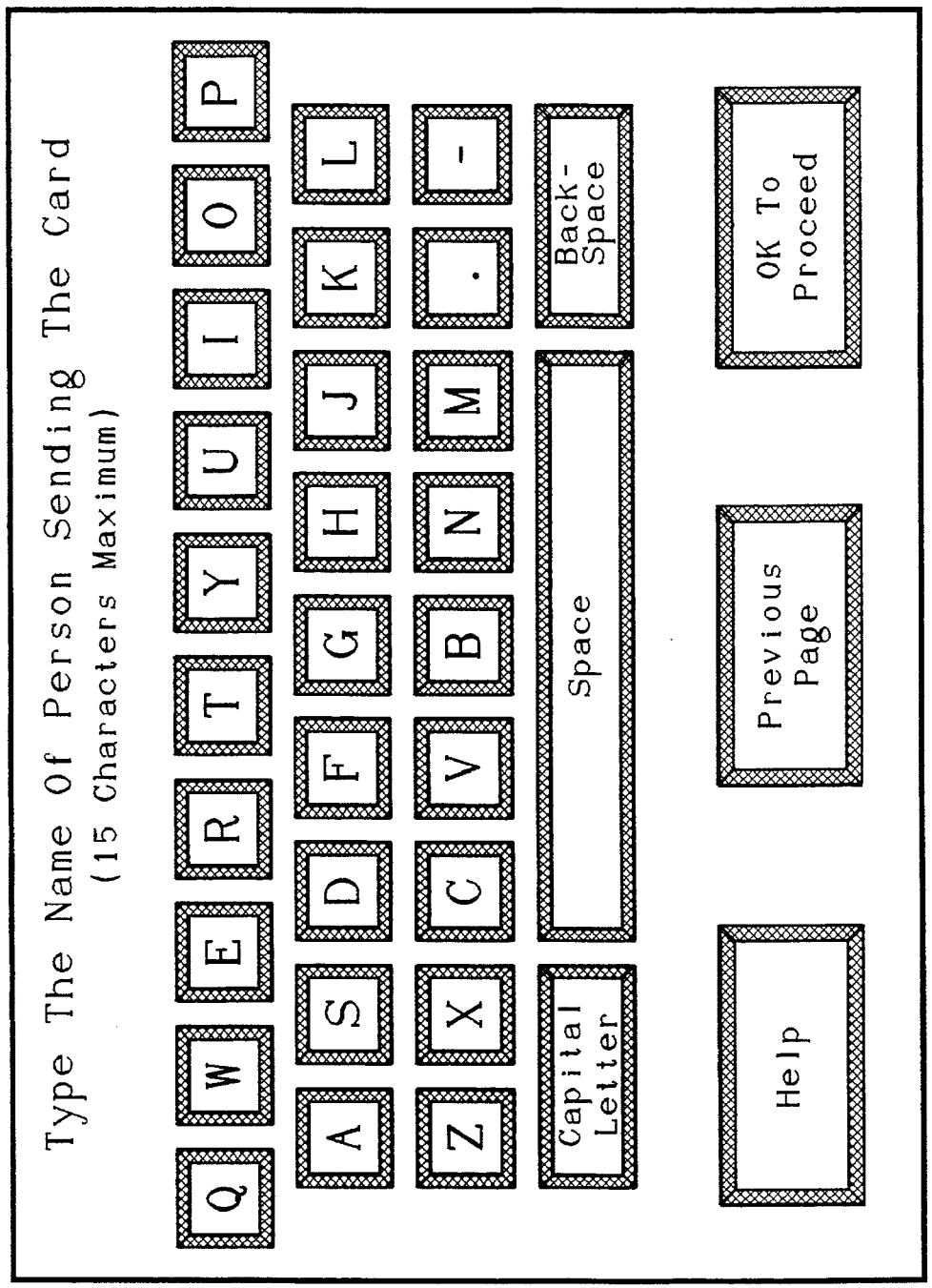
Figure 16:
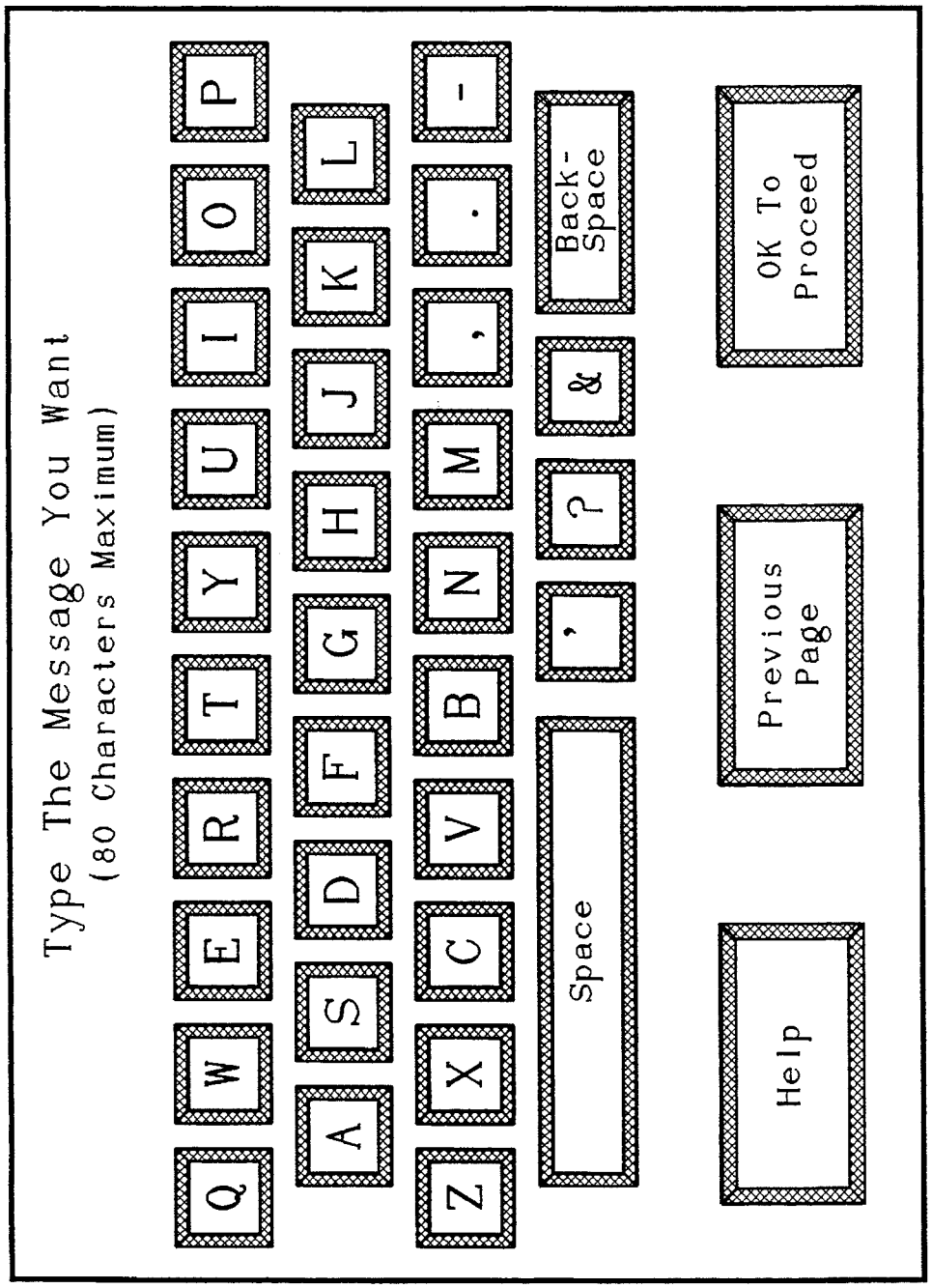
Figure 17:
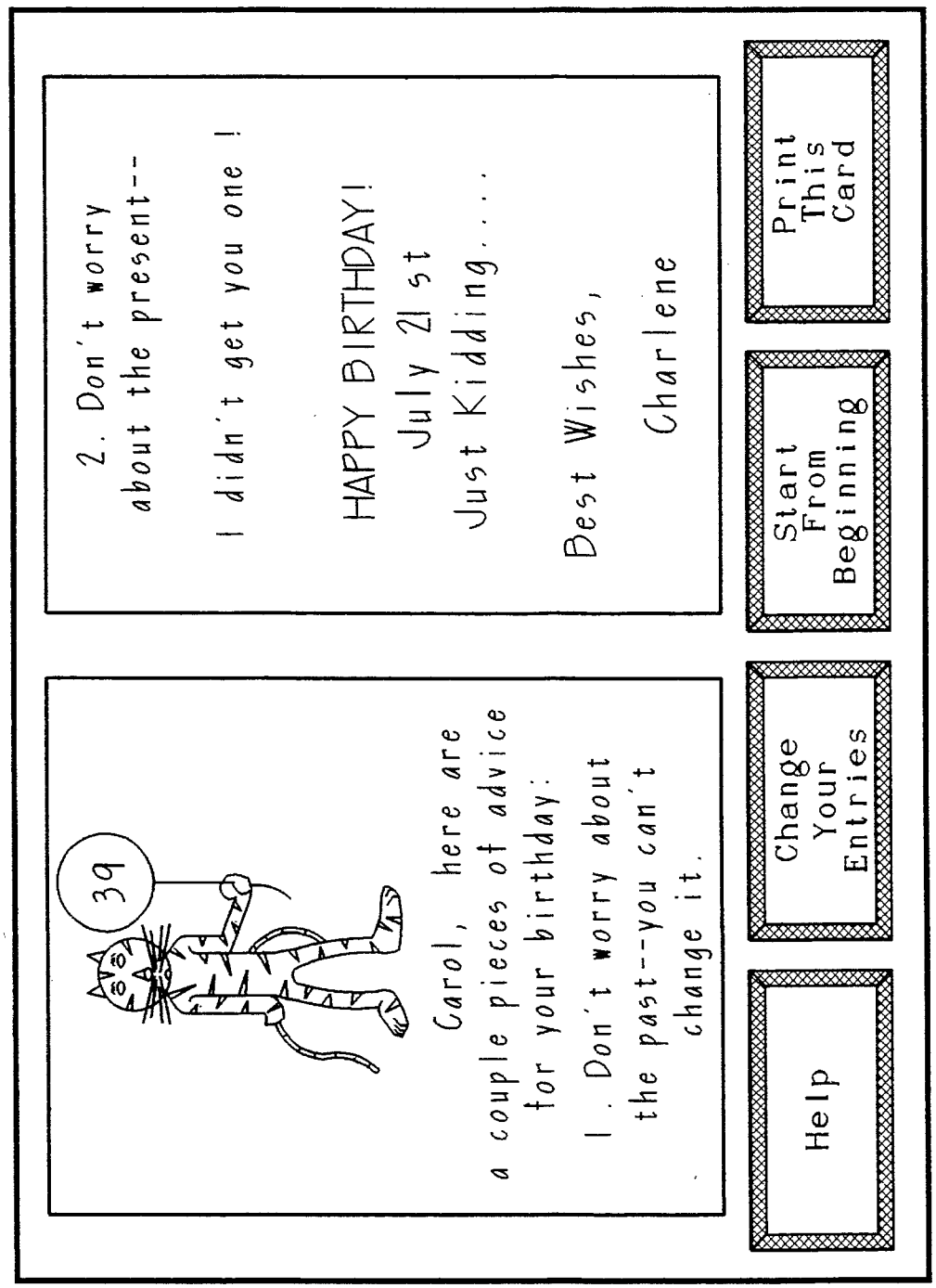

Significantly, once all selections for a desired card application have been entered, a view of the card database file is established that restricts it only to those cards which match the certain criteria or information elicited from the customer via the various displayed screens or prompts (step 139). The first viewable card is then displayed on the monitor 14 as, for example, in FIG. 11. The help option is also available at this point, in step 142. The customer 12 may request the next card to be displayed, or select the card that is being viewed for customization. As shown in FIG. 11, certain options or additional information can now be entered at designated locations in the card design format, such as the receiver's name, birth date, a short message, a closing, and the sender's name.

At step 151 in FIG. 26, the system retrieves and stores the specific card's defined options. The first option screen is then displayed, e.g., the name of the recipient, as in FIG. 12. The option entry takes several different forms. Depending on the selected design format, the customer can enter a string of text of maximum 10 to 80 characters in length. Expansion beyond 80 characters may be provided as an option based on fonts and space allocation on the card product to be printed.

Numbers can be entered for dates (FIGS. 13 & 14), years old, years married, etc., depending on the occasion. Some entries are processed in a manner similar to the above screen level selections. The button touched defines an action code that is cross-referenced to a description in a database file. When the button is selected, the program accesses the file, retrieves the description associated with the action code and holds it in memory along with the text that has been entered.

The text/number entry screens have a button defined for informing the system that the customer has completed the specific entry and to go on to the next option. At any point during the entry/selection of options, the customer may back up to any prior option to change or modify any entry made at that point.

After all the defined options including, e.g., the sender's name (FIG. 15), messages (FIG. 16), dates and/or optional graphics for the card have been entered by the customer, the card is then re-displayed on the monitor with all the customer entries and selections superimposed over the card in the proper locations, font and color for final customer approval. See, e.g., FIG. 17. Once the customer has verified the card for printing, another graphic may be presented to confirm the decision. A customer may operate the system for any length of time up to this point without incurring a charge, so a confirmation of printing is asked for in step 174.

To plot the selected card, the system, in step 182 (FIG. 28) loads from the hard disk the plotter instructions for the card. These instructions are then output to the plotter 24 from a serial or parallel port installed in the computer. The plotter signals may also pass through the buffer 30 internal of the plotter, as depicted in FIG. 3. When the data for plotting the card is finished, the sheet of card stock is held on the plotter bed so that any optionally entered text and graphics can be plotted. For each customer text or number entry, an appropriate plotter font file is opened and a character string is output to the plotter 24. When all the card customizing entries and selections are reproduced, the card sheet is then ejected from the plotter 24.

The customer 12 is then given the option to print another card. If they wish to, the system then returns to the occasion selection screen at entry point 113 in FIG. 21, and if not, it returns to the marketing cycle display at entry point 114.

Figure 22:
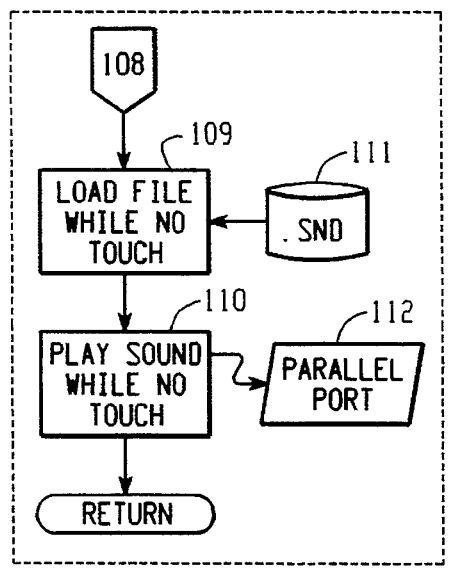
FIGS. 21–38 are flow charts representing operations carried out by the present system during card selection, customization and final printing operations.
Figure 24:
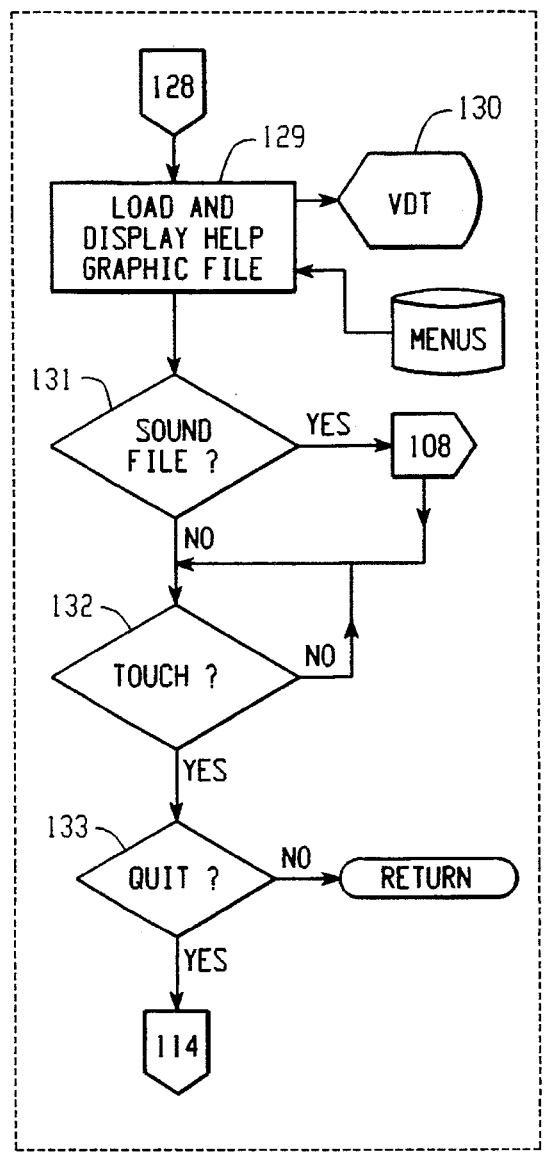
Figure 19:
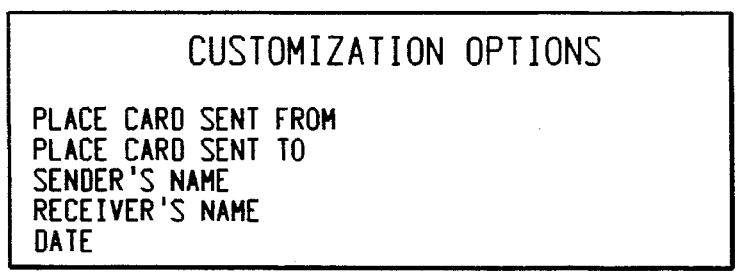
FIG. 19 is a table representing a customization sequence for a card after a sort routine such as in FIG. 17 is carried out by the present system.

FIGS. 30 to 34 show a detail flow of the sound processing routine depicted by blocks 109–112 in FIG. 22. The routine begins at step 200 by opening the sound file and reading in the first 128 positions to retrieve the record length of the digital sound data, the recording sample rate, and channel to play it through. The sample rate is then set in step 202. Program memory is allocated to use a buffer as each sound file block is ready from the file. By using the record length, a number of 16 K (16,384 bytes) blocks is calculated for use during the sound file playback. To accommodate a sound file of any size, the present system stores the file in Expanded Memory (EMS). This is additional memory that is outside the system's normally accessible memory area. It is accessed by mapping 64 K segments of the stored data into an area that the program can use (step 206). Each of these 64 K blocks of data are further subdivided into four 16 K logical pages. As the sound file is read by the program, each block is moved from the buffer into one of the four logical pages. The provide touch interrupt capability, the program checks for a valid touch after each 16 K block of sound data is read (steps 211, 215, 219 and 224). When all four logical pages are filled, that block is moved into EMS and another 64 K block is mapped into program useable memory. This process is continued until the entire file is read or a touch is detected. If a touch is detected, the routine closes the file and releases the EMS memory before returning to the routine's origin. See FIG. 31.

If no touch on the monitor screen is detected during the file loading process, the file is then closed and the system prepares to playback the stored speech data. The system, starting at the beginning of the sound file stored in EMS, begins mapping the data into the useable memory of the computer 20. The data is moved from each logical page into the data buffer and played back through audio hardware attached to the parallel port of the computer 20. As in the reading of the file, after each 16 K block is played back, a valid touch is checked for. If at any point a touch is detected or the number of blocks played is equal to the calculated block count, the routine ends by releasing the EMS memory and returning to its starting point.

FIGS. 35 to 38 show details of the variable font output routine from program steps 185–188. The text string to plot, the font size, pen color to use, the x,y position coordinates, and specific font to use are determined at 301. The routine then opens the specified font file (step 302). The font file uses file structures defined in Tables 311 and 312 in FIG. 36. The font header record is read in first. This record provides the font name, kern value (or between letter spacing) and character height. The latter two values are expressed in 1016 units per inch. In the example output in FIGS. 40(*a*) to 40(*f*), the font is Roman, the kern is 10 and the height is 185. The characters are read into a storage array one at a time in step 305.

Each character is defined with the individual plotter instructions, offset values (for pen positioning), character width, starting position x and y values and number of offsets used. Normally, a plotter pen is driven to a desired position on the surface of a page by outputting instructions including the actual page coordinates of a start position, e.g., (40, 40), of a character to be printed. The start position of a next character to be printed is instructed, e.g., (45, 45) after printing of the first. According to the present routine, "offset" values are determined for the start positions of each character to be printed relative to the start coordinates of a previous printed character. In the foregoing example, the offset values for the start position of the next character are defined as (5, 5) if printing from left to right. If printing is inverted, the start position offset values for the next character would be (−5, −5).

For size adjustment, the program contains a table of all allowable sizes with a corresponding factor. For the example in FIGS. 40(*a*) to 40(*f*), the size is 3 which has a size factor of 1.5. This factor is used in calculating character spacing (kern value times factor; 10 * 1.5=15) and height values (height times factor; 185 * 1.5=277). The text plotted length is then calculated as the sum of each character's width times the size factor (1.5), plus calculated character spacing (15). In FIG. 40(*f*), the length of the string "CUSTOM" would be 180+15+277+15+232+15+180+15+277+15+262, or 1483.

Figure 39:
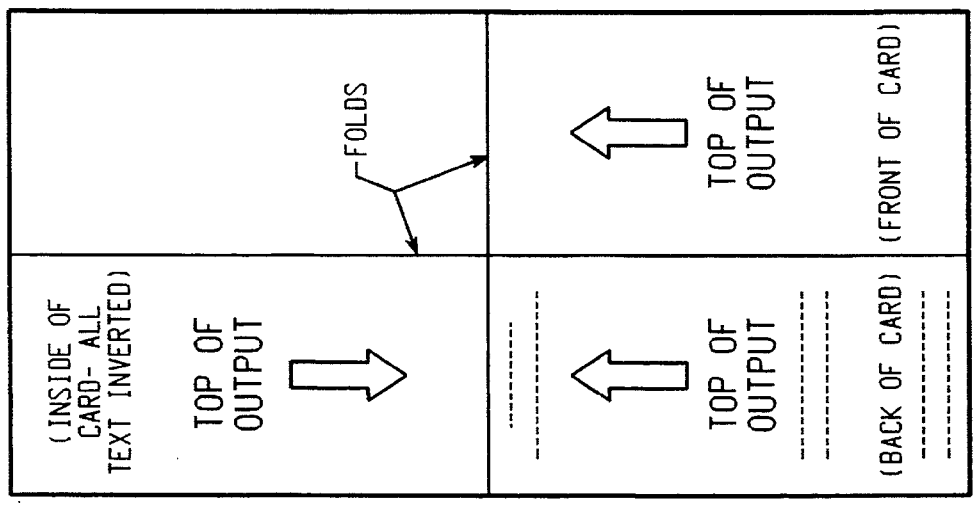
FIG. 39 represents a printing format on a sheet of card stock.
Figure 40A:
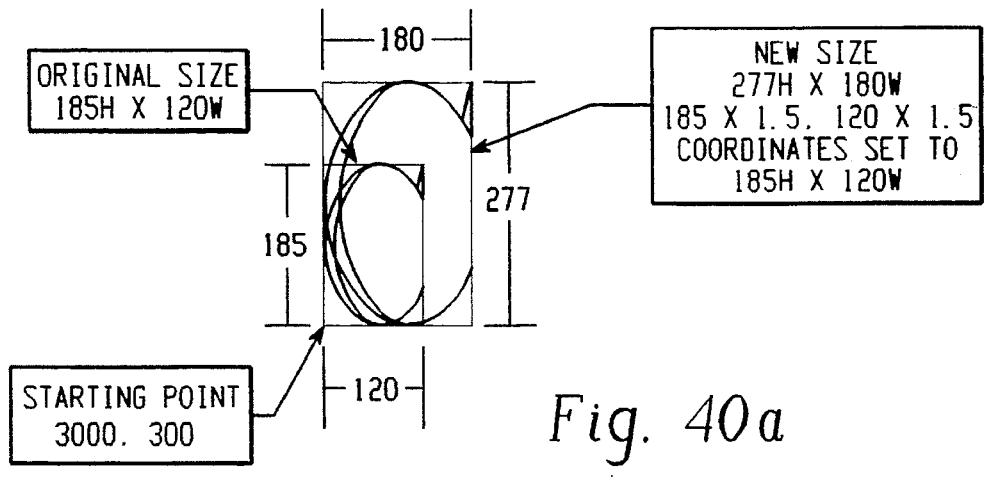
FIGS. 40(a)–40(f) represent printing of a text string on a sheet of card stock by the present system.
Figure 40B:
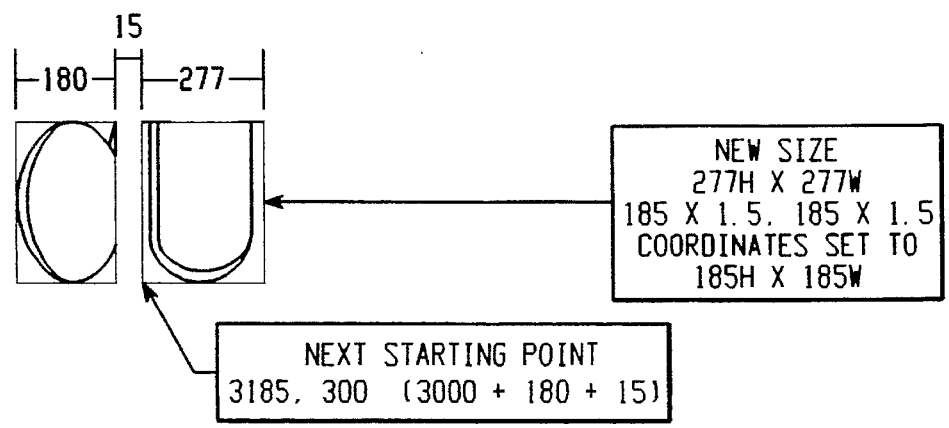
Figure 40C:
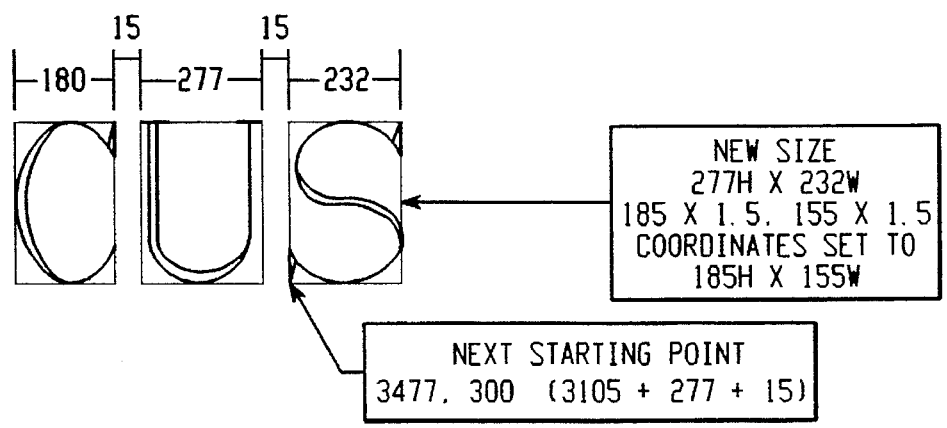
Figure 40D:
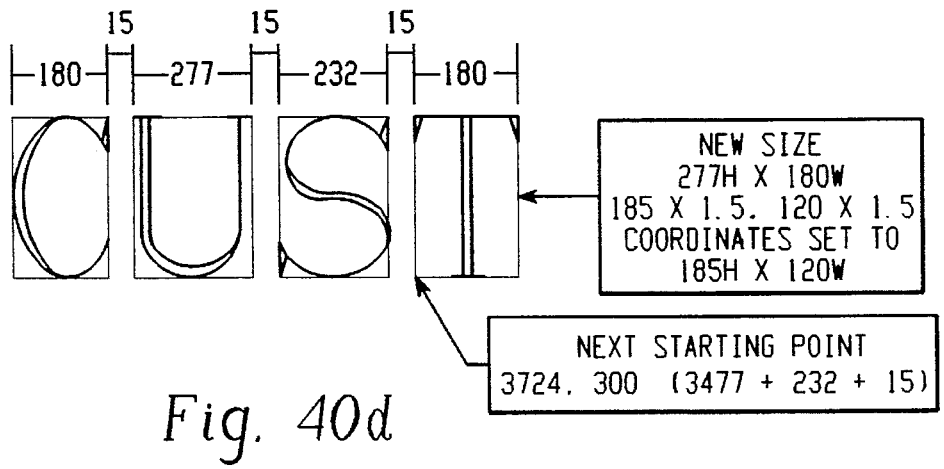
Figure 40E:
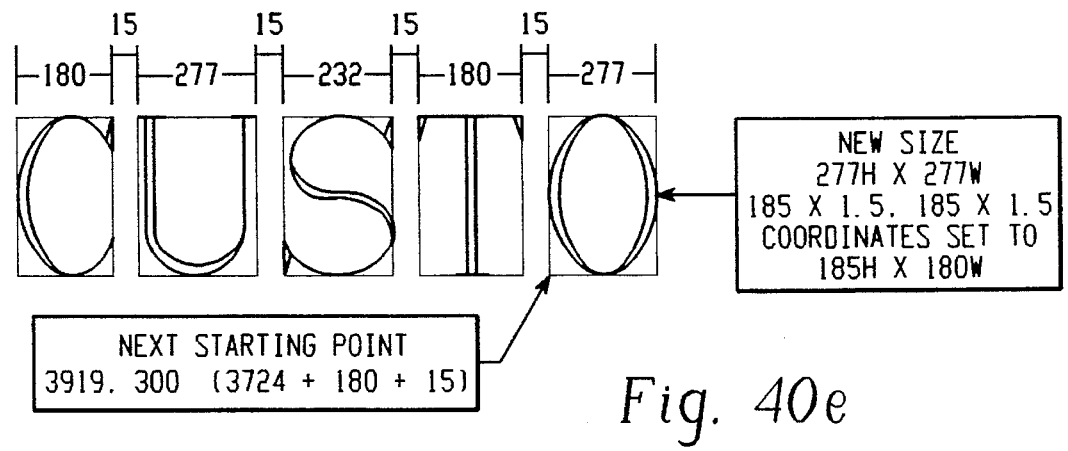
Figure 40F:
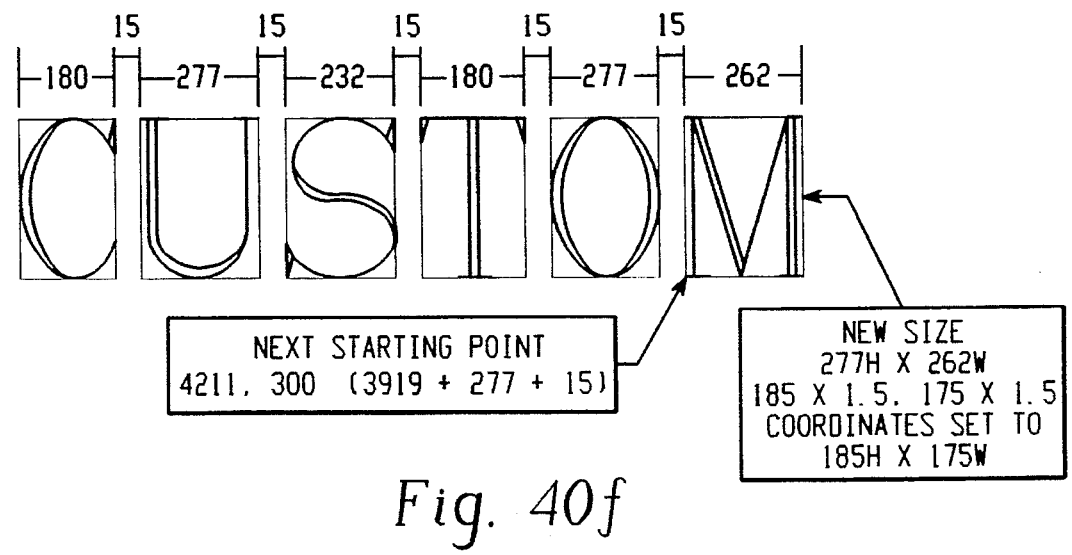

There are three possible line justifications. Right hand start is the default, left hand and center starts are options. The start is based on the defined x,y position coordinates (3000, 300 - FIG. 40(*a*)). If the text is to be centered in the x,y point, the text must be checked to see if it is to be output in the inverted position. The card shown in FIG. 39 illustrates where on the card the inverted text will appear, the upper left hand quadrant. If the text is to be inverted, the calculated plotting start point is the original x position coordinate plus ½ the calculated length (3000+1483/2= 3741). If it is not to be inverted, then the calculation subtracts ½ the calculated length to the original x position (3000−1483/2=2259). In the case of a left hand start, the calculated starting x point is the original point plus the calculated text length for the inverted text (3000+1483= 4483) and less the calculated length for the normal text (3000−1483=1517).

In step 317 (FIG. 31), the plotter 24 is initialized and the pen color selected by sending the appropriate instructions to the plotter 24 via the serial or parallel port on the computer 20. The string of text is then output character by character. If the first character to be printed is an "@" symbol, then that signals the program to instruct the plotter 24 to eject the card sheet. Each character's start point within the string is calculated by adding (if not inverted text) or subtracting (if inverted text), width times size factor, and kern times size factor, to the last known x position value (steps 328–330).

In FIG. 40(*b*), the next position for plotting the "U" is calculated by adding to the start point of 3000 the "C" width times size factor (120 * 1.5=180), and the calculated kern value (10 * 1.5=15), for a new x value of 3185. A plotting area, or box, is configured using the calculated height and calculated width based on sizing. For proper plotting to occur, the coordinates of the box are set to the original height and width. For example, in FIG. 40(*a*), if the original height and width of a character were 185 and 120 units, and the factor was 1.5, the box would then be set at 270 by 180 units.

The original instructions are based on the original height and width, however. So although the box is 270 by 180 units, the plotter 24 is configured with user defined units so that box is scaled to 185 by 120 units. In this fashion, the fonts can be scaled up or down in size from the original using the same instruction set which is based on the 185 by 120 unit size. The plotter pen is then positioned to the font starting coordinates, the instructions sent to the plotter and the character plotted.

A new x starting point is calculated and the process continues, as in FIGS. 40(*b*)–(*f*), until the end of the string is encountered. When the string is complete, the font array memory is released and the routine returns control to the main program.

Figure 41:
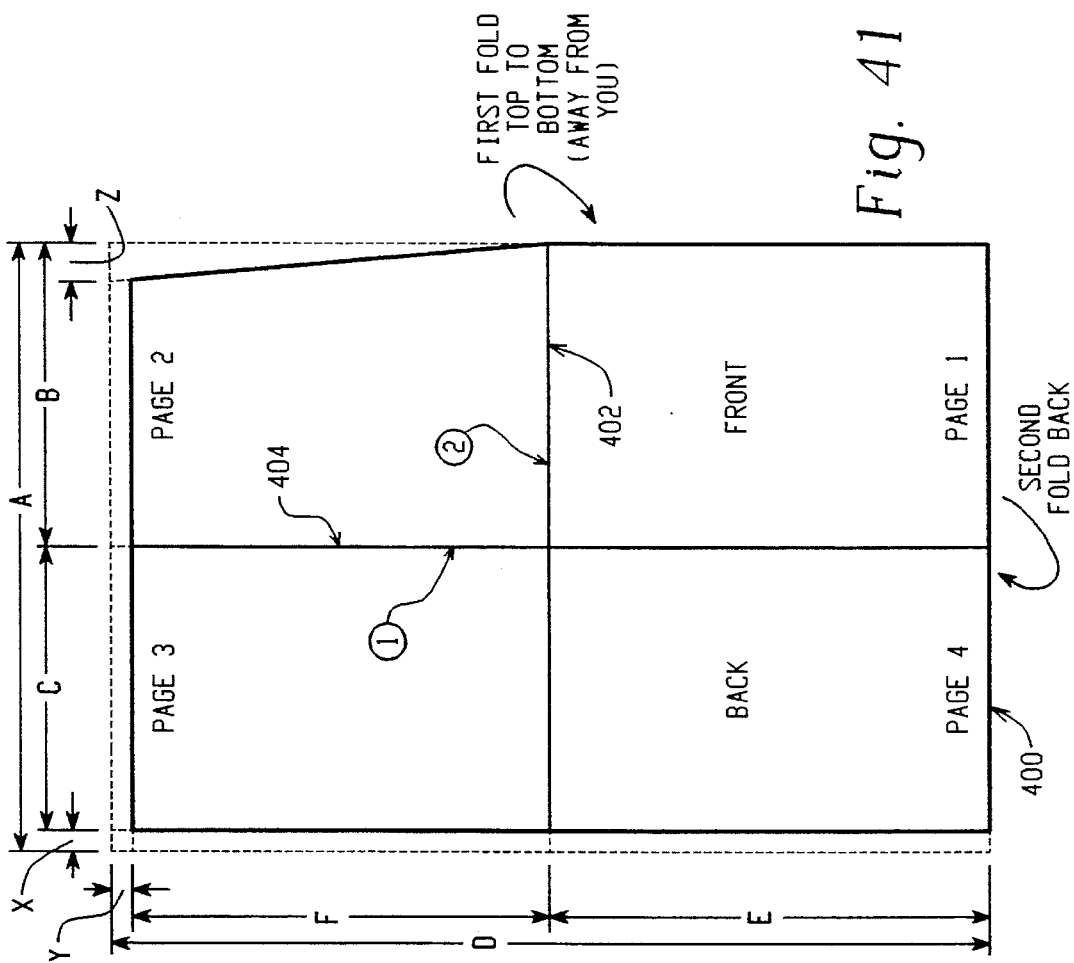
FIG. 41 is a plan view of a sheet of card stock, having pre-scored fold lines and an edge trim cut according to the present invention.

FIG. 41 is a view of a sheet of card stock 400 having pre-scored fold lines and an edge trim cut, according to the invention.

When the printing process is completed, card sheet 400 is discharged, and is delivered to the customer 12 in a flat sheet format (approximate dimensions, e.g., 11"×17"). If the end product is a greeting card of the approximate size of 5½"× 8½", it would then be required that the customer fold the flat sheet in a predetermined fashion (the trade name for the type of fold desired is a "French Fold") so as to provide a finished greeting card suitable for presentation.

If the consumer randomly folds the sheet 400, however, the resulting shape will probably not be of the desired dimensions, nor will there be a neat and even appearance, and the edges of the final folded card will likely not nest evenly.

One typical method of producing a "French Folded" off-the-shelf type of greeting card is to have the card trimmed on all required edges after the printing and folding processes have been completed; all of this having been done at the manufacturer's plant prior to distributing to the retail outlets.

In the present system, the greeting card is printed on a flat sheet 400 of card stock in a retail environment at the point of sale, with no automated trimming of the paper following the printing cycle. If one takes any paper sheet and folds it into a quarter of its original size, however, the resulting shape would not be readily uniform, and the inside pages would protrude from the outside pages, giving an uneven appearance on the edges. Such an appearance is not acceptable for a quality finished greeting card.

In order for the customer to obtain a high quality greeting card as an end product, it is important to effectuate even edges on the card upon completion of a manual folding process. The flat sheet paper stock 400 is therefore pre-scored and trimmed with certain critical dimensional shapes and sizes addressed in order to counter or compensate for the effects of folding on flat sheet 400 by the customer 12.

Pre-scoring the paper helps guide the customer through the folding process and fixes pre-set final dimensions that are required in order to attain the desired end results.

Also, the paper sheet is trimmed in its flat unfolded form to certain dimensions so as to result in, upon the completion of folding by the customer, a finished greeting card with matching finished edges and a uniform finished size.

FIG. 41 shows certain score line center offset dimensions "X" and "Y" and a taper trim cut offset dimension "Z" that are defined in accordance with the size, thickness, density, and the desired finished appearance wanted for the card stock sheet being used. Table 2 below identifies the various dimensions depicted in FIG. 41.

TABLE 2

| Dimension | Definition |
| --- | --- |
| A | The overall width of the sheet 400 |
| B | The midpoint of Dimension A |
| C | B − X = the width of pages 3 & 4 |
| D | The overall height of the sheet 400 |
| E | The mid-point of Dimension D |
| F | E − Y = the height of pages 3 & 2 |
| Z | The starting dimension of a tapered trim cut from the top right edge of sheet 400 to a horizontal fold line 402 |

Typical dimensions for a folded, book-like greeting card having a finished width of 5½ inches and a vertical height of 8½ inches, are as follows:

A=11 inches

B=5½ inches

C=5⁷⁄₁₆ inches

D=17 inches

E=8½ inches

F=8⁷⁄₁₆

X=¹⁄₁₆ inch

Y=¹⁄₁₆ inch

Z=¹⁄₁₆ inch

The foregoing dimensions were found to apply for card sheet stock 80 # text.

In order to derive the finished dimensions for each sheet 400 of finished flat paper stock, and the positioning of the scoring or folding lines, the following steps are taken:

1) Determine the required finished folded dimensions, i.e., finished card width B and height E;
2) Double the required width and the height dimensions;
3) Acquire a rectangular sheet of the desired stock material having the dimensions in step #2;
4) Locate the sheet to conform with the proportional sizing of the finished card size so that the vertical dimension of the sheet stock is held in the same plane as the vertical face of the finished card. Throughout the following steps, firmly hold the sheet with the same relative positioning;
5) Fold the sheet 400 backward along a horizontal line 402 so as to have the pages 1 and 4 that will have printing on them facing forward or outside, and the front page 1 is of the desired finished height E;
6) Next, fold the sheet 400 backward along a vertical line 404 with the front page 1 facing forward and having the desired finished width B;
7) Crease the folded edges sharply without attempting to align any outer edges that might be protruding;
8) Trim the protruding right-hand vertical edges of pages 3 and 4, and the protruding lower edges of the inside pages 2 and 3 slightly shorter, e.g., about ¹⁄₁₆ inch, than the overlying edges of page 1;
9) Trim the inside page 2 along its vertical edge starting at the uppermost outside corner of the page, and continue the cut on an angle to a point that is located slightly inside, e.g., ¹⁄₁₆ inch of the lower right-hand corner of page 1; and
10) Unfold the sheet and note the overall final dimensions B+C and E+F. Fold lines are now defined by the lines 402, 404 which can be prescored on flat sheets 400 of card stock. Dimension Z defines the taper cut for the unfolded sheet.

Once the unfolded flat sheet dimensions are determined for a particular size finished card, dimensions for a paper card die cutting tool can be furnished and the tool made for enabling high-volume production of the sheets 400.

Figure 42:
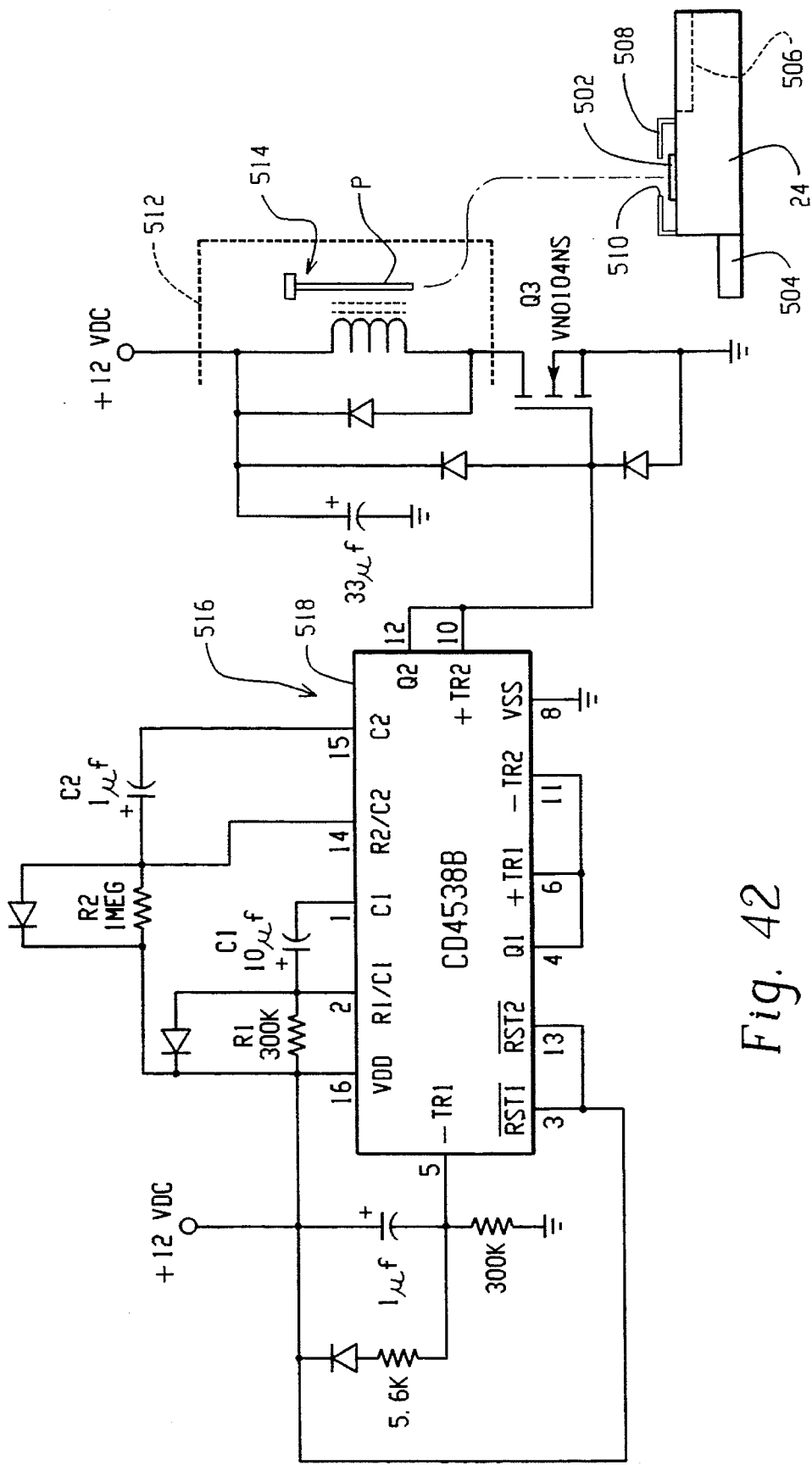
FIG. 42 is a schematic diagram of an automatic card sheet load system according to the invention.

FIG. 42 is a schematic block diagram of an automatic paper load system according to the invention.

Printing device 24 may be, for example, a model 7550 8-pen Hewlett Packard plotter. Such a plotter typically loads paper on start-up or servicing in response to actuation of a button 502 on a front control panel of the plotter by the user. This button activates an electro-mechanical mechanism and, for the following reasons, may be unacceptable in a retail store environment.

The present system requires that new sheets of finished card stock be loaded periodically by, e.g., placing a stack of sheet stock into a paper tray 504 similar to a copier. A new card sheet is loaded onto a printing bed 506 of the plotter 24 by actuation of the paper load button 502. Inasmuch as there may be several other buttons in the area of the paper load button, any one of the other buttons may be touched accidentally and could render the plotter inoperative.

Since the retailer or other person in charge of the installation may be responsible for replenishing the card stock supply and such person may not be adept at operating the printing device 24, the present system aims to allow even an untrained person to accomplish the card stock loading and reloading task.

Further, each time the plotter 24 is turned off, or the flow of electricity is interrupted such as, for example, during periods when the associated retail establishment is closed and power is turned off, a new sheet of card stock must be loaded onto the printing bed 506 when the system is powered-up again. If this were not done, the system would be inoperative.

In accordance with the automatic sheet loading system depicted in FIG. 42, a new sheet of paper card stock is loaded onto the bed 506 of the printing device or plotter 24 automatically each time the system is turned on, for example, via the main power switch 26 in FIG. 3.

Basically, the control button panel on the plotter 24 is first covered with a board or hard protective sheet 508 having an opening 510 in registration with the paper load button 502 of the plotter 24. A housing or box 512 is adapted to be fitted over the plotter control button panel and fixed in place by conventional means. Mounted in the housing 512 is an electro-mechanical plunger mechanism 514 the plunger P of which is aligned with the opening 510 in the control panel board. Plunger mechanism 514 may be type SP-62 (12 VDC) available from Electro Mechanisms company. Thus, when actuated, the plunger P will strike the paper load button 502 and initiate a sheet loading operation. As explained below, the plunger P is electrically actuated each time power to the system is turned on[, or the remote paper load button 38 is depressed].

It may for some printer or plotter models be desirable if not necessary to isolate the paper load button 502 in the control panel from adjacent buttons with which it may be linked via an elastic interlace or webbing. This may be accomplished by cutting of the interlacing material and taping or otherwise maintaining the paper load button 502 of the plotter 24 in a position at which it can be depressed more easily by the plunger mechanism 514.

The plotter 24 has an inherent turn-on or initialization period during which it remains inoperative even after power is applied. This period may be of a duration of a few seconds. During this period, the paper load button 502 will not, even if depressed, initiate a card sheet feed and load operation. Timer control circuit 516 in FIG. 42 operates to actuate the plunger mechanism 514 a sufficient time after power is applied to the plotter 24 so that the paper load button 502 is actuated at a time when the sheet feed/load mechanism in the plotter will operate. To accomplish this, timer control circuit 516 includes the following components.

A CMOS dual precision monostable multivibrator 518, e.g., device type CD4538B is provided with first timer resistor R1 and capacitor C1 having values set for for example, a three-second delayed ON pulse. Second timer resistor R2 and capacitor C2 are set at values to yield a four-second delayed OFF pulse. The values of other components shown in the circuit 516 are exemplary and should work satisfactorily with a supply voltage VDC of 12 volts positive. Detailed specifications for the CD4538B device are available from RCA Data Book-CMOS Integrated Circuits #SSD250C at pp. 350–52, the contents of which are incorporated fully by reference herein. The remote paper load button 38 is in series with the low voltage supply and the plunger mechanism, and is normally biased off. Thus, by activating the load button 38, a retailer or other person in charge may initiate a paper sheet load operation by the plotter at times other than power-up of the system.

The supply voltage VDC is obtained from a conventional regulated 12 volt DC supply (not shown) which powers the timer control circuit 516 at the moment AC power is supplied via the main power switch 26. A negative triggering pulse is derived at the time of power up from the DC supply and applied to negative leading edge triggering terminal 5 of the device 518. A positive pulse of three-second duration is then produced at Q1 terminal 4 which is connected to second mono negative leading edge triggering terminal 11. Thus, after a three second "delay" time, the second mono of the device is triggered to produce a one-second "ON" pulse at Q2 terminal 12. The ON pulse is applied to a gate of transistor Q3, which in turn grounds one side of the plunger mechanism 514 the other side of which is connected to the DC supply. Mechanism 514 is thus energized for about one second to actuate the paper load button 502 after about a three-second delay from powering up of the entire system. Upon lapse of a four-second interval from powering up of the system, the transistor Q3 opens and the plunger mechanism 514 is de-energized so as not to over-heat the mechanism and to allow it to operate once again when the system is powered up after a certain down time.

While the foregoing description represents preferred embodiments of the invention, it will be obvious to those skilled in the art that various changes and modifications may be made, without departing from the true spirit and scope of the invention.

For example, a single terminal or kiosk 10 may include two or more interactive monitors so that more than one person can create and produce a custom greeting card simultaneously.

A "current event greeting card" service may be offered to the retailer by which timely updates of greeting cards that focus on themes of current events, i.e., sporting events, elections, regional interests and the like, can be entered into the system via the telephone installation 22.

The disclosed system may be up-graded to include a computer-generated voice for prompting of the customer through the various selection and customization steps. Through voice prompting, the customer will be more at ease in using the system since there would be less reading to be done from the instructional graphic screens, thus making response time quicker.

The terminal 10 can be structured as a self-contained vending machine, accepting revenue through a bill and coin receiving mechanism and/or via a credit card reader. Also, the system may include the capability of reading and interacting with a magnetic strip on a "greeting card club" membership card issued to customers who purchase, for example, a bulk amount of customizable greeting cards from the retailer offered at a promotional rate.

By use of the computer modem and telephone installation 22, the terminal 10 can be accessed from a central home office to enable immediate greeting card updates, inventory (card stock) reordering, periodic maintenance checks, updating of the "current event" accentuated greeting cards, and the like. As mentioned earlier, certain data gathering operations may be carried out for statistical data accumulation and accounting purposes. Information may be gathered and accumulated by the computer 20 with respect to, for example, which card design formats were selected for printing by customers over a given interval, the time of day each format was selected, and the times during the day when someone touches the monitor screen. This "housekeeping" information may be downloaded at given intervals and a periodic report record printed in accordance with conventional programming techniques.

Further, the system may be provided with a capability of producing special order products for customer pick-up. Such products may include multiple award certificates for a school or business, multiple announcements or invitations sets, signs for the retail store or its customers and the like. The retailer could input the necessary data via an optional keyboard during slow daytime customer traffic periods, or at night.

What we claim is:

1. A method of playing back a relatively large-sized sound data file accessible by a data handling apparatus whereby downloading and reproducing of the file can be terminated at one of a number of successive intervals during the downloading and reproducing operations in response to an interrupt command, the method comprising the steps of:

storing an entire sound data file in sound storage means in a manner such that selected portions of the sound data file can be accessed by said apparatus from the sound storage means;

allocating a first memory area in the apparatus at a time when the sound data file is called for during operation of the apparatus;

reading out a first block of the sound data file from the sound storage means into the first memory area of the apparatus;

detecting if a sound interrupt command has been generated in the apparatus through reading out of the first block of the sound data file from the sound storage means into the first memory area of the apparatus, and terminating operations with respect to said sound data file if said sound interrupt command is detected;

reading out additional blocks of the sound data file in succession from the sound storage means into the first memory area of the apparatus as long as no sound interrupt command is detected prior to reading out of each successive block of the sound data file and until blocks representing the entire sound data file are read out of the sound storage means into the first memory area of the apparatus;

terminating operations with respect to said sound data file if said sound interrupt command is detected prior to reading out of a next successive block of the sound data file from the sound storage means;

allocating expanded memory means associated with the apparatus to have a capacity adequate to store the entire sound data file;

moving blocks of the sound data file from said first memory area into said expanded memory means until the entire sound data file is moved into said expanded memory means in the absence of said sound interrupt command;

allocating a second memory area of the apparatus and moving blocks of the sound data file from the expanded memory means into said second memory area;

reproducing from said second memory area the blocks of the sound data file as moved from said expanded memory means into said second memory area while detecting, after reproduction of each block of the sound data file in said second memory area, if a sound interrupt command has been generated in the apparatus; and terminating reproducing operations with respect to said sound data file if said sound interrupt command is detected prior to reproducing a next successive block of the sound data file from the second memory area of the apparatus.

2. The method of claim 1, including generating said sound interrupt command by touching a touch-sensitive input device of the apparatus.

3. The method of claim 1, including reading out in said first block of the sound data file from the sound storage means, record length data corresponding to the record length of the entire sound file.

4. The method of claim 3, including calculating a total number of blocks of the sound data file to be read out from the sound storage means to obtain the entire sound data file, in accordance with the record length data.

5. The method of claim 4, including determining an end of the entire sound data file when said total number of blocks are read out from said first memory area, and thereafter moving the blocks of the sound data file from the expanded memory means into the second memory area for reproducing.

6. A method of preparing and folding a flat sheet of stock material to form a generally rectangular book-like card having an outside front page surface, an outside rear page surface, and two opposed inside page surfaces, whereby edges of the page surfaces are aligned with one another when the stock is folded to form the card, the method comprising the steps of:

determining desired finished dimensions for the book-like card including a vertical height and a width;

substantially doubling the desired finished vertical height and width dimensions of the card thereby arriving at initial height and width dimensions for a flat sheet of stock material;

defining a horizontal center line extending medially of a top edge and a bottom edge of said flat sheet;

defining a vertical center line extending medially of a left edge and a right edge of said flat sheet;

pre-scoring the flat sheet of stock material along a horizontal parallel offset line spaced a first predetermined distance above said horizontal center line in the vertical direction;

pre-scoring the flat sheet of stock material along a vertical parallel offset line spaced a second predetermined distance from said vertical center line in the horizontal direction toward the left edge of said flat sheet;

defining an outside front page surface of the book-like card by a lower right-hand quadrant formed by an intersection between the horizontal offset line and the vertical offset line;

defining an outside rear page surface of the card by a lower left-hand quadrant formed by said intersection;

cutting a tapered edge on said flat sheet between a point on the top edge of the sheet located a third predetermined distance from the right edge of the sheet and a point on the right edge coincident with the horizontal offset line;

folding said flat sheet along the pre-scored horizontal offset line so that the upper portion of the sheet is folded behind said outside front and said outside rear page surfaces;

folding the sheet along the pre-scored vertical offset line so that the folded upper portion of the sheet defines the two opposed inside page surfaces of the book-like card; and setting said first, said second, and said third predetermined distances so that the edges of all page surfaces substantially coincide with one another when said book-like card is closed.

7. A system for enabling sheet feeding of a printer or plotter device having a sheet feeding mechanism by which a sheet of a recording medium is fed from a sheet supply onto a printing bed of the device to be printed in response to actuation of a sheet load button, the device having an initial start-up period during which the sheet feeding mechanism is inoperative, said system comprising:

plunger means adapted to be fixed on a part of the printer or plotter device in the region of said sheet load button;

said plunger plunger means being adapted to exert an actuating force on said sheet load button when the plunger means is energized; and delay means coupled between said plunger means and source means for supplying power to the printer or plotter device, for energizing the plunger means and causing the sheet load button of said device to be actuated after a first time delay corresponding to at least the initial start-up period of said device once the source means supplies power to the device;

wherein the sheet load button is actuated a sufficient time after initial turn-on of said device so that a sheet of recording medium will be fed from said sheet supply by the sheet feeding mechanism onto the printing bed of said device.

8. The system of claim 7, wherein said delay means includes timer circuit means for producing a first timing pulse corresponding to said first time delay when said power source means supplies power to the device.

9. The system of claim 8, wherein said timer circuit means includes means for producing a second timing pulse at the end of said first timing pulse for energizing said plunger means.

10. The system of claim 9, wherein said second timing pulse is of a duration just sufficient to cause the sheet load button of the device to be actuated.

* * * * *